US012566720B2

(12) United States Patent
Zhao et al.

(10) Patent No.: US 12,566,720 B2
(45) Date of Patent: Mar. 3, 2026

(54) INTEGRATED CIRCUIT, CHIP, AND ELECTRONIC DEVICE

(71) Applicant: Huawei Technologies Co., Ltd., Shenzhen (CN)

(72) Inventors: Yan Zhao, Beijing (CN); Ke Zhang, Chengdu (CN); Yu Liang, Dongguan (CN); Jian Zhang, Chengdu (CN); Nan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 18/467,379

(22) Filed: Sep. 14, 2023

(65) Prior Publication Data

US 2023/0418774 A1 Dec. 28, 2023

Related U.S. Application Data

(63) Continuation of application No. PCT/CN2022/073946, filed on Jan. 26, 2022.

(30) Foreign Application Priority Data

Mar. 15, 2021 (CN) .......................... 202110275611.7
Apr. 30, 2021 (CN) .......................... 202110482175.0

(51) Int. Cl.
G06F 13/368 (2006.01)
G06F 13/16 (2006.01)

(52) U.S. Cl.
CPC ........ G06F 13/368 (2013.01); G06F 13/1668 (2013.01)

(58) Field of Classification Search
CPC ... G06F 13/1668; G06F 13/368; H01L 23/50; H01L 25/0655; H03K 19/17744; H03K 19/17796; H04L 12/12
See application file for complete search history.

(56) References Cited

U.S. PATENT DOCUMENTS

| | | | |
|---|---|---|---|
| 6,291,896 B1* | 9/2001 | Smith .................. | G09G 3/3648 257/E23.079 |
| 2006/0060954 A1 | 3/2006 | Meyer-Berg | |
| 2006/0186920 A1 | 8/2006 | Feng et al. | |
| 2009/0179141 A1* | 7/2009 | Sarig ...................... | H10F 39/18 438/59 |
| 2015/0180780 A1 | 6/2015 | Froese et al. | |
| 2016/0148901 A1* | 5/2016 | Alvarez-Icaza Rivera .................. | H10B 43/20 257/773 |
| 2016/0240497 A1* | 8/2016 | Chen .................. | H01L 25/0655 |
| 2017/0063564 A1 | 3/2017 | Kumar et al. | |
| 2020/0412666 A1 | 12/2020 | Papadantonakis et al. | |
| 2021/0167029 A1* | 6/2021 | Somma ............. | H01L 23/49816 |
| 2022/0310561 A1* | 9/2022 | Lin ........................ | H01L 25/18 |

FOREIGN PATENT DOCUMENTS

| | | |
|---|---|---|
| CN | 103457881 A | 12/2013 |
| CN | 105895598 A | 8/2016 |

* cited by examiner

*Primary Examiner* — Phong H Dang
(74) *Attorney, Agent, or Firm* — Slater Matsil, LLP

(57) ABSTRACT

This disclosure provides an integrated circuit, a chip, and an electronic device. The chip includes D dice, where D is a positive integer greater than or equal to 2, the D dice include a first die and a second die, and the first die and the second die are rotationally symmetrical.

20 Claims, 11 Drawing Sheets

System
100

101

102

103

111

112

113

121

122

123

Network device 200

Input
circuit
202

Chip
201

Output
circuit
203

INTEGRATED CIRCUIT, CHIP, AND ELECTRONIC DEVICE

CROSS-REFERENCE TO RELATED APPLICATIONS

This application is a continuation of International Application No. PCT/CN2022/073946, filed on Jan. 26, 2022, which claims priority to Chinese Patent Application No. 202110482175.0, filed on Apr. 30, 2021 and Chinese Patent Application No. 202110275611.7, filed on Mar. 15, 2021. The disclosures of the aforementioned applications are hereby incorporated by reference in their entireties.

TECHNICAL FIELD

This disclosure relates to the field of chip technologies, and more specifically, to an integrated circuit, a chip, and an electronic device.

BACKGROUND

A switching chip is an important part of a network device. A main function of the switching chip is to complete traffic switch between any network-side interfaces of the chip.

In the past, a switching bandwidth and a quantity of ports of the switching chip are small, and implementation of each switching chip is not difficult. Generally, each switching chip includes only one die. However, because the switching chip needs to implement increasingly large quantities of switching ports and ports, and a silicon area required by the switching chip is increasingly large, it is very difficult to implement one switching chip depending only on one die. Therefore, a switching chip including two or more dice is bound to appear in the future.

If the switching chip includes two or more dice, it is necessary to consider how the dice are connected.

SUMMARY

This disclosure provides an integrated circuit, a chip, and an electronic device, which can implement a switching chip including a plurality of dice.

According to a first aspect, an embodiment of this disclosure provides a chip. The chip includes D dice, D is a positive integer greater than or equal to 2, the D dice include a first die and a second die, and the first die and the second die are rotationally symmetrical.

The chip may be a chip used in a network device such as a switch or a router, and may also be referred to as a switching chip. The foregoing technical solution provides a switching chip including two dice, which can reduce a burden of a single die and improve a computing power of the entire chip.

Optionally, structures of the first die and the second die may be the same. In this way, the first die and the second die may be completed through one-time tape-out.

In a possible design, a value of D is 4, and the D dice further include a third die and a fourth die. The second die and the third die are rotationally symmetrical; the third die and the fourth die are rotationally symmetrical; and the fourth die and the first die are rotationally symmetrical.

Structures of the first die, the second die, the third die, and the fourth die may be same. In this way, the first die, the second die, the third die, and the fourth die may be completed through one-time tape-out.

In a possible design, a rotation angle between the second die and the first die is 90°; a rotation angle between the third die and the second die is 90°; a rotation angle between the fourth die and the third die is 90°; and a rotation angle between the first die and the fourth die is 90°.

In a possible design, the first die includes a first tile array, the first tile array includes N×N tiles, and N is a positive integer greater than or equal to 2; the second die includes a second tile array, and the second tile array includes N×N tiles; the third die includes a third tile array, and the third tile array includes N×N tiles; and the fourth die includes a fourth tile array, and the fourth tile array includes N×N tiles.

In a possible design, the first die includes N groups of first buses and N groups of second buses; the second die includes N groups of third buses and N groups of fourth buses; the third die includes N groups of fifth buses and N groups of sixth buses; and the fourth die includes N groups of seventh buses and N groups of eighth buses. Each of the first bus to the eighth bus can be configured as a row bus or a column bus, configurations of the first bus, the third bus, the fifth bus, and the seventh bus are the same, configurations of the second bus, the fourth bus, the sixth bus, and the eighth bus are the same, and configurations of the first bus and the second bus are different.

In a possible design, an $n^{th}$ group of first buses in the N groups of first buses is connected to an $n^{th}$ group of third buses in the N groups of third buses, N tiles belonging to the first die in an $n^{th}$ row of tiles in the switching chip are connected to the $n^{th}$ group of first buses, N tiles belonging to the second die in the $n^{th}$ row of tiles are connected to the $n^{th}$ group of third buses, and n is a positive integer greater than or equal to 1 and less than or equal to N; an $n^{th}$ group of fifth buses in the N groups of fifth buses is connected to an $n^{th}$ group of seventh buses in the N groups of seventh buses, N tiles belonging to the third die in an $(N+n)^{th}$ row of tiles in the switching chip are connected to the $n^{th}$ group of fifth buses, and N tiles belonging to the fourth die in the $(N+n)^{th}$ row of tiles are connected to the $n^{th}$ group of seventh buses; an $n^{th}$ group of second buses in the N groups of second buses is connected to an $n^{th}$ group of eighth buses in the N groups of eighth buses, N tiles belonging to the first die in an $n^{th}$ column of tiles in the switching chip are connected to the $n^{th}$ group of second buses, and N tiles belonging to the fourth die in the $n^{th}$ column of tiles are connected to the $n^{th}$ group of eighth buses; and an $n^{th}$ group of fourth buses in the N groups of fourth buses is connected to an $n^{th}$ group of sixth buses in the N groups of sixth buses, N tiles belonging to the second die in an $(N+n)^{th}$ column of tiles in the switching chip are connected to the $n^{th}$ group of fourth buses, and N tiles belonging to the third die in the $(N+n)^{th}$ column of tiles are connected to the $n^{th}$ group of sixth buses.

By using the foregoing technical solution, traffic transmission among longitudinal dice can be implemented through buses between the dice. For example, traffic transmission of two tiles between the first die and the fourth die may be implemented through the second bus and the eighth bus. In this way, a problem of longitudinal bandwidth requirement expansion can be avoided.

In a possible design, the first bus is configured as a row bus, and the second bus is configured as a column bus. The $n^{th}$ group of first buses includes 2×N groups of transmission lines, each group of transmission lines in the 2×N groups of transmission lines includes K transmission line subgroups, a first interface of an $n^{th}$ tile in the $n^{th}$ row of tiles includes a first sending interface and a first receiving interface, the first sending interface is connected to one group of transmission lines in the 2×N groups of transmission lines, the first receiving interface is connected to the 2×N groups of transmission lines, and K is a positive integer greater than or equal to 1; and the $n^{th}$ group of second buses includes N groups of first transmission lines and N groups of second transmission lines, each group of transmission lines in the N groups of first transmission lines and the N groups of second transmission lines includes K transmission line subgroups, a second interface of an $n^{th}$ tile in the $n^{th}$ column of tiles includes a second sending interface and a second receiving interface, the second sending interface is connected to the N groups of first transmission lines, and the second receiving interface is connected to an $n^{th}$ group of second transmission lines in the N groups of second transmission lines.

In a possible design, the N groups of first transmission lines in the $n^{th}$ group of second buses are connected to N groups of third transmission lines in the $n^{th}$ group of eighth buses, and the N groups of second transmission lines in the $n^{th}$ group of second buses are connected to N groups of fourth transmission lines in the $n^{th}$ group of eighth buses.

In a possible design, any two tiles in N tiles belonging to a same die in each column of tiles of the switching chip are connected through one group of ninth buses, and the ninth bus includes 2×K transmission line subgroups.

In a possible design, a value of D is 4, and the D dice further include a third die and a fourth die. The third die and the fourth die are rotationally symmetrical; the first die includes a first tile array, the first tile array includes N×M tiles, N is a positive integer greater than or equal to 2, and M is a positive integer greater than or equal to 2; the second die includes a second tile array, and the second tile array includes N×M tiles; the third die includes a third tile array, and the third tile array includes N×M tiles; the fourth die includes a fourth tile array, and the fourth tile array includes N×M tiles; the first die includes N groups of first row buses and M groups of first column buses; the second die includes N groups of second row buses and M groups of second column buses; the third die includes N groups of third row buses and M groups of third column buses; the fourth die includes N groups of fourth row buses and M groups of fourth column buses; an $n^{th}$ group of first row buses in the N groups of first row buses is connected to an $n^{th}$ group of third row buses in the N groups of third row buses, and n is a positive integer greater than or equal to 1 and less than or equal to N; an $m^{th}$ group of first column buses in the M groups of first column buses is connected to an $m^{th}$ group of fourth column buses in the M groups of fourth column buses, and m is a positive integer greater than or equal to 1 and less than or equal to M; an $n^{th}$ group of fourth row buses in the N groups of fourth row buses is connected to an $n^{th}$ group of second row buses in the N groups of second row buses; an $m^{th}$ group of third column buses in the M groups of third column buses is connected to an $m^{th}$ group of second column buses in the M groups of second column buses; the $m^{th}$ group of first column buses in the M groups of first column buses includes N groups of first transmission lines and N groups of second transmission lines, each group of transmission lines in the N groups of first transmission lines and the N groups of second transmission lines includes K transmission line subgroups, a first interface of an $n^{th}$ tile in an $m^{th}$ column of tiles in the first tile array includes a first sending interface and a first receiving interface, the first sending interface is connected to the N groups of first transmission lines, and the first receiving interface is connected to an $n^{th}$ group of second transmission lines in the N groups of second transmission lines; the $m^{th}$ group of fourth column buses in the M groups of fourth column buses includes N groups of third transmission lines and N groups of fourth transmission lines, each group of transmission lines in the N groups of third transmission lines and the N groups of fourth transmission lines includes K transmission line subgroups, a second interface of an $n^{th}$ tile in an $m^{th}$ column of tiles in the fourth tile array includes a second sending interface and a second receiving interface, the second sending interface is connected to the N groups of third transmission lines, and the second receiving interface is connected to an $n^{th}$ group of fourth transmission lines in the N groups of fourth transmission lines; and the N groups of first transmission lines are connected to the N groups of third transmission lines, and the N groups of second transmission lines are connected to the N groups of fourth transmission lines.

In a possible design, the first die includes a first tile array, the first tile array includes N×M tiles, N is a positive integer greater than or equal to 2, and M is a positive integer greater than or equal to 2; the second die includes a second tile array, and the second tile array includes N×M tiles; the first die includes N groups of first row buses and M groups of first column buses; the second die includes N groups of second row buses and M groups of second column buses; an $m^{th}$ group of first column buses in the M groups of first column buses is connected to an $m^{th}$ group of second column buses in the M groups of second column buses, and m is a positive integer greater than or equal to 1 and less than or equal to M; the $m^{th}$ group of first column buses in the M groups of first column buses includes N groups of first transmission lines and N groups of second transmission lines, each group of transmission lines in the N groups of first transmission lines and the N groups of second transmission lines includes K transmission line subgroups, a first interface of an $n^{th}$ tile in an $m^{th}$ column of tiles in the first tile array includes a first sending interface and a first receiving interface, the first sending interface is connected to the N groups of first transmission lines, and the first receiving interface is connected to an $n^{th}$ group of second transmission lines in the N groups of second transmission lines; the $m^{th}$ group of second column buses in the M groups of second column buses includes N groups of third transmission lines and N groups of fourth transmission lines, each group of transmission lines in the N groups of third transmission lines and the N groups of fourth transmission lines includes K transmission line subgroups, a second interface of an $n^{th}$ tile in an $m^{th}$ column of tiles in the second tile array includes a second sending interface and a second receiving interface, the second sending interface is connected to the N groups of third transmission lines, and the second receiving interface is connected to an $n^{th}$ group of fourth transmission lines in the N groups of fourth transmission lines; and the N groups of first transmission lines are connected to the N groups of third transmission lines, and the N groups of second transmission lines are connected to the N groups of fourth transmission lines.

In a possible design, any two tiles in N tiles belonging to a same die in each column of tiles of the switching chip are connected through one group of tenth buses, and the tenth bus includes 2×K transmission line subgroups.

According to a second aspect, an embodiment of this disclosure further provides an integrated circuit. The integrated circuit includes N rows and M columns of tiles, and each tile in the N rows and M columns of tiles includes: a first interface, a second interface, a third interface, and a fourth interface; the integrated circuit further includes: N groups of first buses and M groups of second buses. The first bus can be configured as one of a row bus and a column bus, and the second bus can be configured as one of the row bus and the column bus; a first interface of each tile in an $n^{th}$ row of tiles in the integrated circuit is connected to an $n^{th}$ group of first buses in the N groups of first buses, third interfaces of any two tiles in the $n^{th}$ row of tiles are connected through a third bus, and n is a positive integer greater than or equal to 1 and less than or equal to N; and a second interface of each tile in an $m^{th}$ column of tiles in the integrated circuit is connected to an $m^{th}$ group of second buses in the M groups of second buses, fourth interfaces of any two tiles in the $m^{th}$ column of tiles are connected through a fourth bus, and m is a positive integer greater than or equal to 1 and less than or equal to M.

By using the integrated circuit in the embodiment of the second aspect, physical structures of different dice in a same chip may be completely the same, and a chip may be implemented only by performing configuration based on a location of a die. In this way, a chip that includes a plurality of integrated circuits provided in the embodiment of the second aspect may be achieved through one-time tape-out.

Further, the foregoing integrated circuit includes a bus that can be configured as a column bus. In this case, traffic between two integrated circuits arranged longitudinally may be achieved through a column bus. In this way, a problem of longitudinal bandwidth expansion can be avoided.

In a possible design, the first bus is configured as a row bus, and the second bus is configured as a column bus. The $n^{th}$ group of first buses includes $2 \times M$ groups of transmission lines, each group of transmission lines in the $2 \times M$ groups of transmission lines includes K transmission line subgroups, a first interface of an $m^{th}$ tile in the $n^{th}$ row of tiles includes a first sending interface and a first receiving interface, the first sending interface is connected to one group of transmission lines in the $2 \times M$ groups of transmission lines, the first receiving interface is connected to the $2 \times M$ groups of transmission lines, and K is a positive integer greater than or equal to 1; and the $m^{th}$ group of second buses includes N groups of first transmission lines and N groups of second transmission lines, each group of transmission lines in the N groups of first transmission lines and the N groups of second transmission lines includes K transmission line subgroups, a second interface of an $n^{th}$ tile in the $m^{th}$ column of tiles includes a second sending interface and a second receiving interface, the second sending interface is connected to the N groups of first transmission lines, and the second receiving interface is connected to an $n^{th}$ group of second transmission lines in the N groups of second transmission lines.

In a possible design, the first bus is configured as a column bus, and the second bus is configured as a row bus. The $n^{th}$ group of first buses includes $M+1$ groups of transmission lines, each group of transmission lines in the $M+1$ groups of transmission lines includes K transmission line subgroups, a first interface of an $m^{th}$ tile in the $n^{th}$ row of tiles includes a first sending interface and a first receiving interface, the first sending interface is connected to M groups of transmission lines in the $M+1$ groups of transmission lines, and the first receiving interface is connected to one group of transmission lines other than the M groups of transmission lines in the $M+1$ groups of transmission lines; and the $m^{th}$ group of second buses includes $2 \times N$ groups of transmission lines, each group of transmission lines in the $2 \times N$ groups of transmission lines includes K transmission line subgroups, a second interface of an $n^{th}$ tile in the $m^{th}$ column of tiles includes a second sending interface and a second receiving interface, the second sending interface is connected to one group of transmission lines in the $2 \times N$ groups of transmission lines, and the second receiving interface is connected to the $2 \times N$ groups of transmission lines.

In a possible design, the third bus includes K pairs of transmission lines, and the fourth bus includes K pairs of transmission lines.

In a possible design, a third interface of the $m^{th}$ tile includes a third input interface and a third output interface, one transmission line in each pair of transmission lines in the K pairs of transmission lines included in the third bus is connected to the third input interface, and the other transmission line is connected to the third output interface; and a fourth interface of the $n^{th}$ tile includes a fourth input interface and a fourth output interface, one transmission line in each pair of transmission lines in the K pairs of transmission lines included in the fourth bus is connected to the fourth input interface, and the other transmission line is connected to the fourth output interface.

According to a third aspect, an embodiment of this disclosure further provides an integrated circuit, including a kernel unit, a switching unit, a first interface, a second interface, a third interface, and a fourth interface. The kernel unit includes a fifth interface, a sixth interface, and a seventh interface; the switching unit is configured to control one of the fifth interface and the sixth interface to be connected to the first interface; the switching unit is further configured to control the other of the fifth interface and the sixth interface to be connected to the second interface; and the switching unit is further configured to control one of the third interface and the fourth interface to the seventh interface.

The integrated circuit in the foregoing embodiment may be the tile in the embodiment of the first aspect or the embodiment of the second aspect. The switching unit in the foregoing embodiment may control a connection relationship between interfaces, to select a function of each interface based on a requirement.

In a possible design, the switching unit is further configured to control the fourth interface to be connected to the seventh interface when controlling the first interface to be connected to the fifth interface; and control the third interface to be connected to the seventh interface when controlling the first interface to be connected to the sixth interface.

In a possible design, the switching unit is specifically configured to control the fourth interface to be connected to the seventh interface when controlling the first interface to be connected to the fifth interface, and control the third interface to be connected to the seventh interface when controlling the first interface to be connected to the sixth interface.

In a possible design, the fifth interface includes a row bus input interface and a row bus output interface; the sixth interface includes a column bus input interface and a column bus output interface; and the seventh interface includes a full-mesh bus input interface and a full-mesh bus output interface.

In a possible design, the kernel unit further includes an eighth interface, and the eighth interface includes a full-mesh bus input interface and a full-mesh bus output interface; and the switching unit is further configured to control the third interface to be connected to the eighth interface when controlling the first interface to be connected to the fifth interface, and control the fourth interface to be connected to the eighth interface when controlling the first interface to be connected to the sixth interface.

According to a fourth aspect, an embodiment of this disclosure further provides an integrated circuit, including a first interface, a second interface, a third interface, and a fourth interface. The integrated circuit further includes a switching unit. The switching unit is configured to send, through the second interface or the third interface, traffic received through the first interface; and the switching unit is further configured to send, through the fourth interface, traffic received through the second interface or the third interface, where the first interface is a row bus interface, the second interface is a column bus interface, the third interface is a full-mesh bus interface, and the fourth interface is a network-side interface.

The integrated circuit in the foregoing embodiment may be the kernel in the embodiment of the third aspect. The integrated circuit in the foregoing embodiment includes a column bus interface. In this way, a die provided with the foregoing integrated circuit can implement traffic transmission among longitudinal dies through the column bus. In this way, a problem of longitudinal bandwidth expansion can be avoided.

In a possible design, the first interface includes a first input interface and a first output interface, the second interface includes a second input interface 1, a second input interface 2, and a second output interface, the third interface includes a third input interface and a third output interface, and the fourth interface includes a fourth input interface and a fourth output interface. The first input interface is configured to be connected to $2 \times M$ groups of transmission lines included in the row bus, wherein M is a positive integer greater than or equal to 2; the first output interface is configured to be connected to one group of transmission lines in the $2 \times M$ groups of transmission lines; the second output interface is configured to be connected to N groups of first transmission lines included in the column bus, where N is a positive integer greater than or equal to 2; the second input interface 1 is configured to be connected to the N groups of first transmission lines, and the second input interface 2 is configured to be connected to one group of second transmission lines in N groups of second transmission lines included in the column bus; the third input interface is configured to be connected to N−1 groups of transmission lines in the full-mesh bus; and the third output interface is configured to be connected to the other N−1 groups of transmission lines in the full-mesh bus.

According to a fifth aspect, an electronic device is provided, including any one of the foregoing chips or any one of the foregoing integrated circuits.

The electronic device in the foregoing embodiment may be a network device, such as a switch or a router, or may be a server or a storage device.

DETAILED DESCRIPTION OF ILLUSTRATIVE EMBODIMENTS

The following describes technical solutions of this disclosure with reference to the accompanying drawings.

A network device in embodiments of this disclosure may be any device including a switching chip in embodiments of this disclosure, for example, may be a network device such as a switch or a router.

Figure 1:
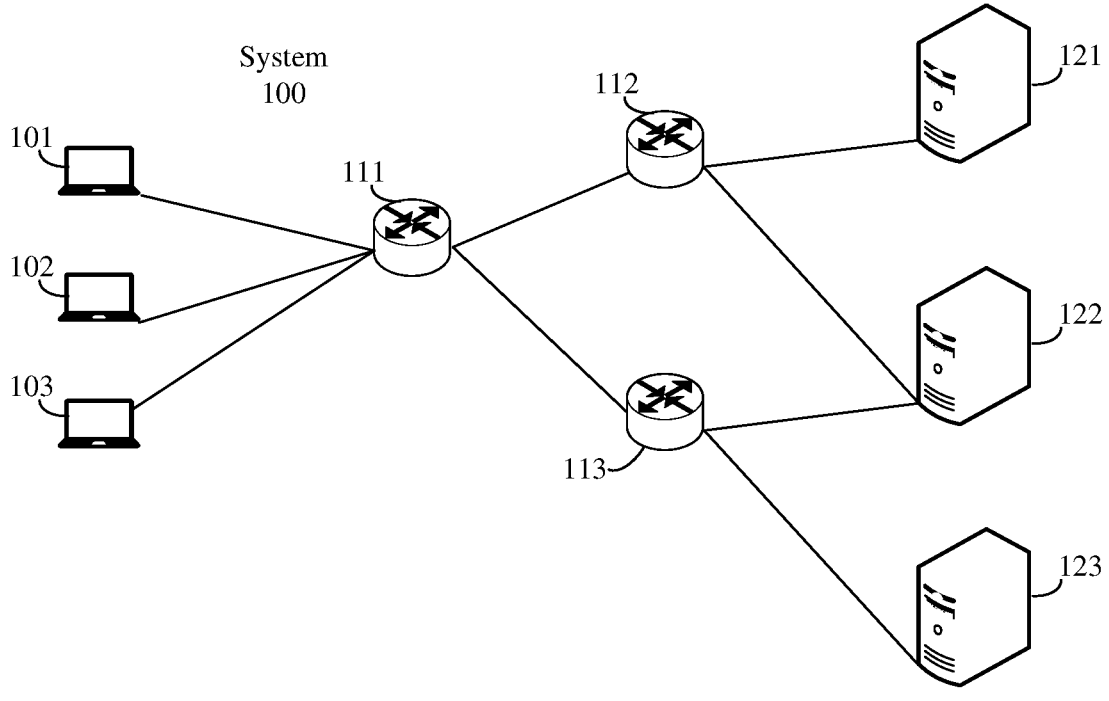
FIG. 1 is a schematic diagram of an disclosure scenario according to an embodiment of this disclosure.

FIG. 1 is a schematic diagram of an disclosure scenario according to an embodiment of this disclosure. A system 100 shown in FIG. 1 includes a terminal device 101, a terminal device 102, a terminal device 103, a network device 111, a network device 112, a network device 113, a server 121, a server 122, and a server 123.

In the scenario shown in FIG. 1, uplink data sent by a terminal device to a server may be forwarded by a network device to the corresponding server.

For example, uplink data sent by the terminal device 101 to the server 122 may be first sent to the network device in, the network device in forwards the uplink data to the network device 112, and finally the network device 112 forwards the uplink data to the server 122.

Downlink data sent by the server to the terminal device may also be forwarded by the network device.

For example, downlink data sent by the server 123 to the terminal device 103 may be first sent to the network device 113, the network device 113 forwards the downlink data to the network device in, and finally the network device in forwards the downlink data to the terminal device 103.

Figure 2:
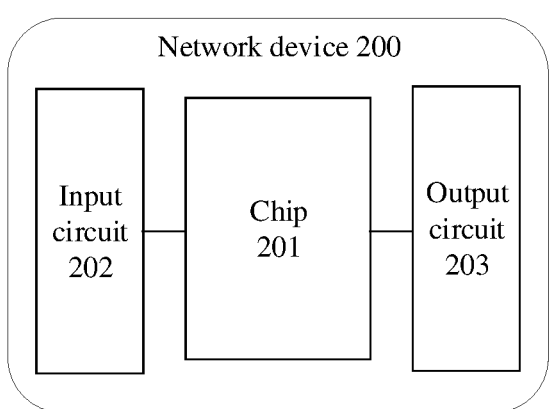
FIG. 2 is a schematic block diagram of a structure of a network device.

FIG. 2 is a schematic block diagram of a structure of a network device. A network device 200 shown in FIG. 2 may be the network device in, the network device 112, or the network device 113 shown in FIG. 1.

As shown in FIG. 2, the network device 200 includes a chip 201, an input circuit 202, and an output circuit 203. After receiving uplink data from a terminal device, the input circuit 202 sends the uplink data to the chip 201. The chip 201 selects, based on a destination address in the uplink data, a proper output port from a plurality of output ports included in the output circuit 203, and sends the uplink data to a next device (for example, a server or another network device) through the output port.

Figure 3:
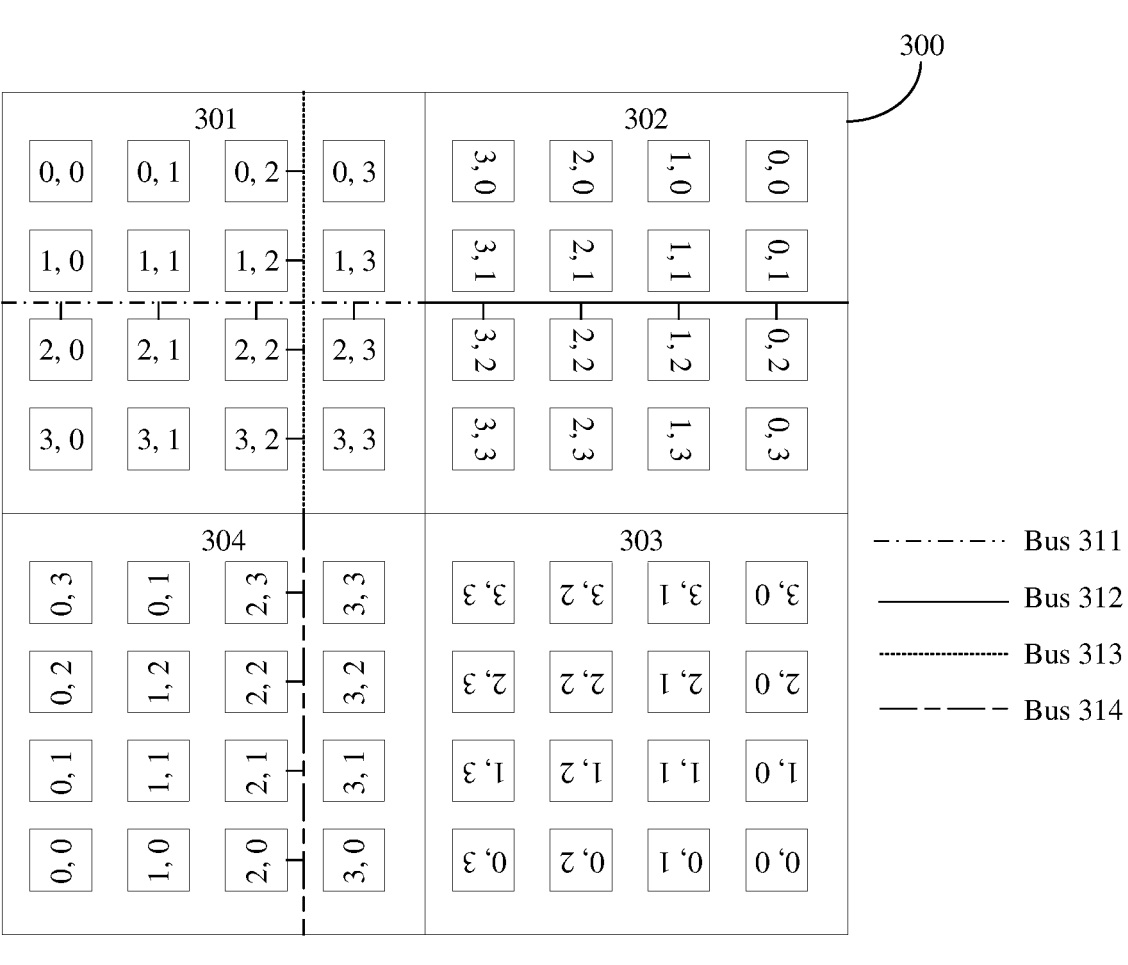
FIG. 3 is a schematic block diagram of a structure of a chip according to an embodiment of this disclosure.

FIG. 3 is a schematic block diagram of a structure of a chip according to an embodiment of this disclosure. As shown in FIG. 3, a chip 300 includes a die 301, a die 302, a die 303, and a die 304.

As shown in FIG. 3, the die 301, the die 302, the die 303, and the die 304 each include $4 \times 4$ tiles. The die 301 and the die 302 are rotationally symmetrical, and a rotation angle is 90°; the die 302 and the die 303 are rotationally symmetrical, and a rotation angle is 90°; the die 303 and the die 304 are rotationally symmetrical, and a rotation angle is 90°; and the die 304 and the die 301 are rotationally symmetrical, and a rotation angle is 90°.

As shown in FIG. 3, a third row of tiles of the chip 300 includes eight tiles in total, and the eight tiles include four tiles (respectively a tile (2, 0), a tile (2, 1), a tile (2, 2), and a tile (2, 3)) in the die 301 and four tiles (respectively a tile (3, 2), a tile (2, 2), a tile (1, 2), and a tile (0, 2)) in the die 302. The four tiles in the die 301 are connected through a bus 311, and the four tiles in the die 302 are connected through a bus 312, where the bus 311 and the bus 312 are configured as row buses (which may also be referred to as lateral buses). The bus 311 is connected to the bus 312. The bus 311 is connected to a sending interface (not shown in the figure) of the die 301, the sending interface (not shown in the figure) of the die 301 is connected to a receiving interface (not shown in the figure) of the die 302, and the bus 312 is connected to the receiving interface (not shown in the figure) of the die 302.

As shown in FIG. 3, a third column of tiles of the chip 300 includes eight tiles in total, and the eight tiles include four tiles (respectively a tile (0, 2), a tile (1, 2), a tile (2, 2), and a tile (3, 2)) in the die 301 and four tiles (respectively a tile (2, 3), a tile (2, 2), a tile (2, 1), and a tile (2, 0)) in the die 304. The four tiles in the die 301 are connected through a bus 313, and the four tiles in the die 304 are connected through a bus 314, where the bus 313 and the bus 314 are configured as column buses (which may also be referred to as longitudinal buses). The bus 313 is connected to the bus 314. The bus 313 is connected to a sending interface (not shown in the figure) of the die 301, the sending interface (not shown in the figure) of the die 301 is connected to a receiving interface (not shown in the figure) of the die 304, and the bus 314 is connected to the receiving interface (not shown in the figure) of the die 304.

Figure 4:
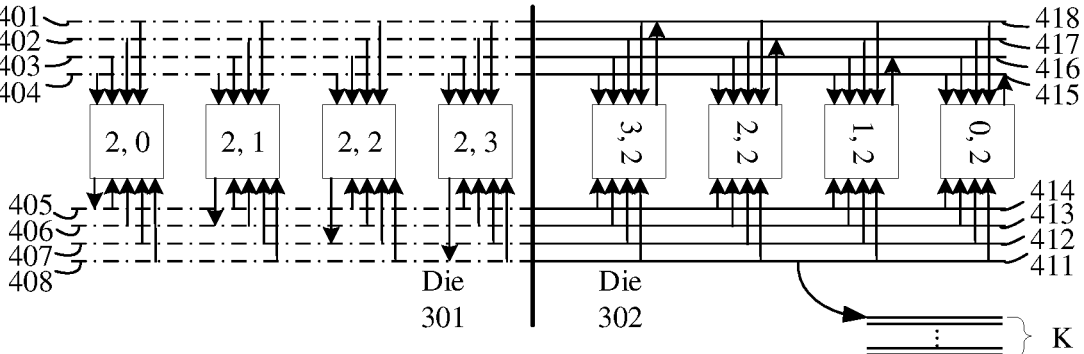
FIG. 4 is a schematic diagram of a connection relationship between a row bus and a tile.
Figure 5:
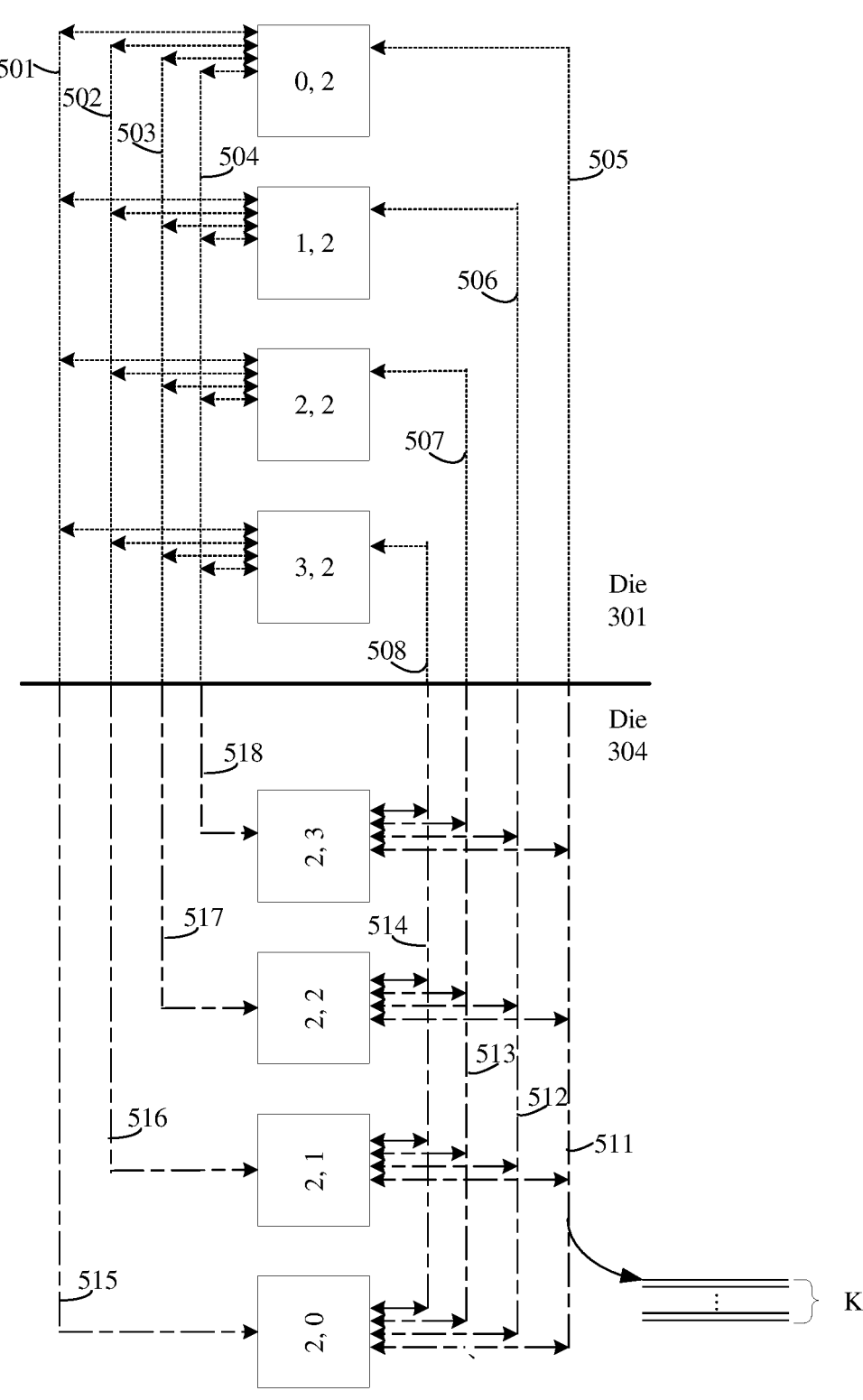
FIG. 5 is a schematic diagram of a connection relationship between a column bus and a tile.

The following describes the row bus and the column bus with reference to FIG. 4 and FIG. 5.

FIG. 4 is a schematic diagram of a connection relationship between a row bus and a tile.

As shown in FIG. 4, the bus 311 includes eight groups of transmission lines in total, which are respectively transmission lines 401 to 408.

The bus 312 includes eight groups of transmission lines in total, which are respectively transmission lines 411 to 418.

Each tile in the die may include two configurable interfaces, which may be referred to as an interface A and an interface B respectively. The interface A may be configured as an interface connected to the row bus, or may be configured as an interface connected to the column bus. Similarly, the interface B may be configured as an interface connected to the row bus, or may be configured as an interface connected to the column bus. The interface A may include an output interface and an input interface, and the interface B may also include an output interface and an input interface. For ease of description, the output interface of the interface A may be referred to as an output interface A, the input interface of the interface A may be referred to as an input interface A, the output interface of the interface B may be referred to as an output interface B, and the input interface of the interface B may be referred to as an input interface B.

Each of the four tiles in the die 301 is connected to the transmission lines 401 to 408. The interface A of each of the four tiles is configured as an interface connected to the row bus. The output interface A of each tile is connected to a corresponding transmission line. For example, the output interface A of the tile (2, 0) is connected to the transmission line 405, and the output interface A of the tile (2, 1) is connected to the transmission line 406. The input interface A of each tile is connected to the eight groups of transmission lines (namely, the transmission lines 401 to 408).

Each of the four tiles in the die 302 is connected to the transmission lines 411 to 418. The interface B of each of the four tiles is configured as an interface connected to the row bus. The output interface B of each tile is connected to one group of transmission lines. For example, the output interface B of the tile (3, 2) is connected to the transmission line 418, and the output interface B of the tile (2, 2) is connected to the transmission line 417. The input interface B of each tile is connected to the eight groups of transmission lines (namely, the transmission lines 411 to 418).

The transmission lines 401 to 404 and the transmission lines 411 to 414 may be referred to as receiving buses. The transmission lines 405 to 408 and the transmission lines 415 to 418 may be referred to as sending and receiving buses.

Each group of transmission lines shown in FIG. 4 may include K transmission line subgroups, and each transmission line subgroup in the K transmission line subgroups may include one or more transmission lines. K is a positive integer greater than or equal to 1.

A quantity of the transmission lines included in each transmission line subgroup may be determined based on a width requirement of each transmission line subgroup and a width of a single transmission line. For example, if the width of the single transmission line is 1 bit, and the width requirement of each transmission line subgroup is 8 bits, each transmission line subgroup needs to include eight transmission lines.

FIG. 5 is a schematic diagram of a connection relationship between a column bus and a tile.

As shown in FIG. 5, the bus 313 includes a total of eight groups of transmission lines: a transmission line 501, a transmission line 502, a transmission line 503, a transmission line 504, a transmission line 505, a transmission line 506, a transmission line 507, and a transmission line 508.

The bus 314 includes a total of eight groups of transmission lines: a transmission line 511, a transmission line 512, a transmission line 513, a transmission line 514, a transmission line 515, a transmission line 516, a transmission line 517, and a transmission line 518.

As described above, each tile in the die may include two configurable interfaces, which may be referred to as an interface A and an interface B respectively. The interface A may be configured as an interface connected to the row bus, or may be configured as an interface connected to the column bus. Similarly, the interface B may be configured as an interface connected to the row bus, or may be configured as an interface connected to the column bus. The interface A may include an output interface A and an input interface A, and the interface B may also include an output interface B and an input interface B.

Each of the four tiles in the die 301 is connected to the transmission lines 501 to 504, and each tile is connected to one of the transmission lines 505 to 508. The interface B in each of the four tiles is configured as an interface connected to the column bus. The output interface B of each tile is connected to the transmission lines 501 to 504. For example, the output interface B of the tile (0, 2) is connected to the transmission lines 501 to 504, and the output interface B of the tile (1, 2) is connected to the transmission lines 501 to 504. The input interface B of each tile is connected to one of the transmission lines 505 to 508. For example, the input interface B of the tile (0, 2) is connected to the transmission line 505, and the input interface B of the tile (1, 2) is connected to the transmission line 506.

Each of the four tiles in the die 304 is connected to the transmission lines 511 to 514, and each tile is connected to one of the transmission lines 515 to 518. The interface A of each of the four tiles is configured as an interface connected to the column bus. The output interface A of each tile is connected to the transmission lines 511 to 514. For example, the output interface A of the tile (2, 0) is connected to the transmission lines 511 to 514, and the output interface A of the tile (2, 1) is connected to the transmission lines 511 to 514. The input interface A of each tile is connected to one of the transmission lines 515 to 518. For example, the input interface A of the tile (2, 0) is connected to the transmission line 515, and the input interface A of the tile (2, 1) is connected to the transmission line 516.

Each group of transmission lines shown in FIG. 5 may include K transmission line subgroups, and each transmission line subgroup in the K transmission line subgroups may include one or more transmission lines. K is a positive integer greater than or equal to 1.

A quantity of the transmission lines included in each transmission line subgroup may be determined based on a width requirement of each transmission line subgroup and a width of a single transmission line. For example, if the width of the single transmission line is 1 bit, and the width requirement of each transmission line subgroup is 8 bits, each transmission line subgroup needs to include eight transmission lines.

It can be seen from FIG. 4 that an output interface of a tile is connected to one group of transmission lines, and an input interface of each tile in a row of tiles in which the tile is located is connected to the group of transmission lines. Therefore, data output by the tile may be sent to any tile in the row of tiles through the group of transmission lines. Therefore, these row buses may be referred to as multidrop buses.

It can be seen from FIG. 5 that each group of transmission lines in the transmission lines 501 to 504 are connected to the output interfaces of the four tiles in the die 301. The transmission lines 501 to 504 are in a one-to-one correspondence with the transmission lines 515 to 518. Each group of transmission lines in the transmission lines 501 to 504 may converge output data of four tiles belonging to a same die and then send the data to one tile in another die through a corresponding group of transmission lines. For example, the transmission line 501 may converge output data of the four tiles of the die 301 and then send the data to the tile (2, 0) in the die 304 through the corresponding transmission line 515; and the transmission line 502 may converge the output data of the four tiles of the die 301 and then send the data to the tiles (2, 1) in the die 304 through the corresponding transmission line 516. Similarly, each group of transmission lines in the transmission lines 511 to 514 is connected to the output interfaces of the four tiles in the die 304. The transmission lines 511 to 514 are in a one-to-one correspondence with the transmission lines 505 to 508. Each group of transmission lines in the transmission lines 511 to 514 may converge output data of four tiles belonging to a same die and then send the data to one tile in another die through a corresponding group of transmission lines. Therefore, the column bus may be referred to as a convergence bus.

As described above, each tile includes an interface A that may be configured to be connected to the row bus or the column bus and an interface B that may be configured to be connected to the row bus or the column bus. In some embodiments, if an interface A in a tile is configured as an interface connected to the row bus, an interface B of the tile is configured as an interface connected to the column bus; and correspondingly, if an interface A in a tile is configured as an interface connected to the column bus, an interface B of the tile is configured as an interface connected to the row bus.

For example, the interface A of the tile (2, 2) in the die 301 is configured as an interface connected to the row bus, and the interface B is configured as an interface connected to the column bus. The interface A of the tile (2, 2) in the die 304 is configured as an interface connected to the row bus, and the interface B is configured as an interface connected to the column bus. The interface B of the tile (2, 2) in the die 302 is configured as an interface connected to the column bus, and the interface A is configured as an interface connected to the row bus.

Figure 6:
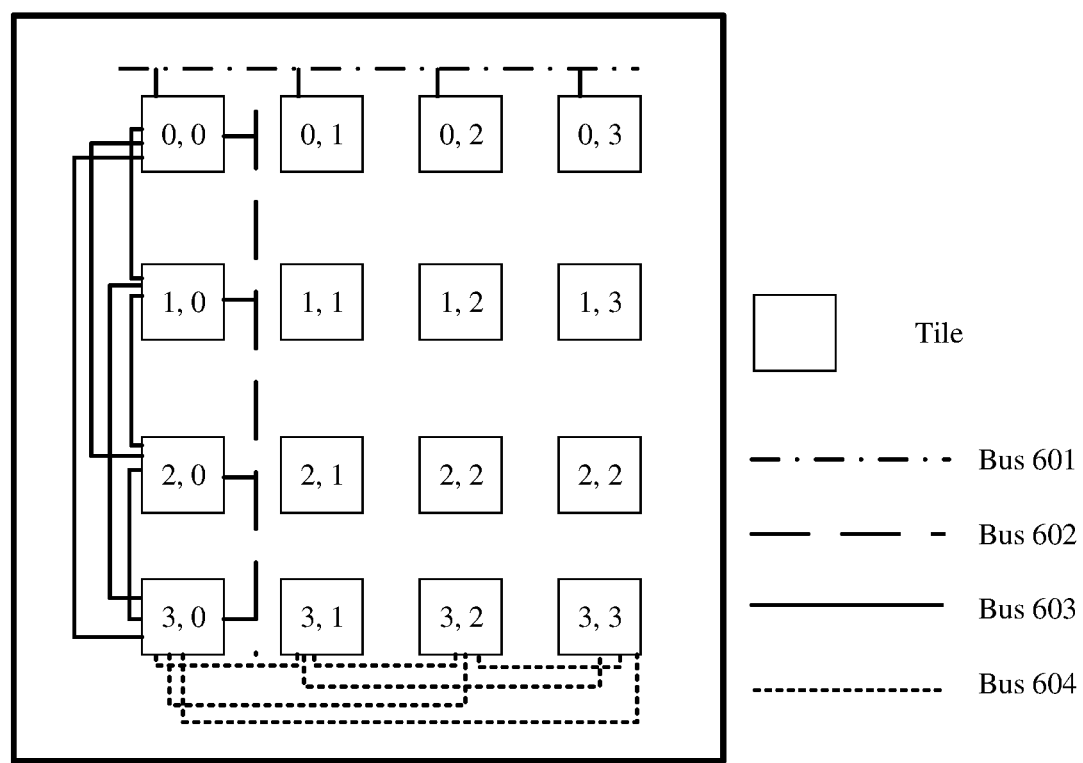
FIG. 6 is a schematic diagram of a die.

FIG. 6 is a schematic diagram of a die. The die shown in FIG. 6 may be any of the dice 301 to 304 shown in FIG. 3.

The die shown in FIG. 6 includes four groups of buses, which are respectively buses 601 to 604. It may be understood that each row of tiles in FIG. 6 has a corresponding bus 601 and is connected to the corresponding bus 601, but FIG. 6 only shows that a first row of tiles is connected to the bus 601. Similarly, each column of tiles has a corresponding bus 602 and is connected to the corresponding bus 602, but FIG. 6 only shows that a first column of tiles is connected to the bus 602. Any two tiles in each column of tiles are connected through the bus 603, but FIG. 6 shows a relationship between the first column of tiles and the bus 603. Any two tiles in each row of tiles are connected through the bus 604, but FIG. 6 shows only a connection relationship between a fourth row of tiles and the bus 604.

The bus 601 and the bus 602 are buses of a same structure. The bus 601 may be configured as one of a row bus or a column bus, and the bus 602 may be configured as one of the row bus or the column bus. If the bus 601 is configured as a row bus, the bus 602 is configured as a column bus; and if the bus 601 is configured as a column bus, the bus 602 is configured as a row bus.

For example, if the die shown in FIG. 6 is the die 301 or the die 303 shown in FIG. 3, the bus 601 is configured as a row bus and the bus 602 is configured as a column bus; and if the die shown in FIG. 6 is the die 302 or the die 304 shown in FIG. 3, the bus 601 is configured as a column bus and the bus 602 is configured as a row bus.

If the bus 601 or the bus 602 is configured as a row bus, for a connection relationship between the bus 601 or the bus 602 and each tile, refer to FIG. 4. If the bus 601 or the bus 602 is configured as a column bus, for a connection relationship between the bus 601 or the bus 602 and each tile, refer to FIG. 5.

Figure 7:
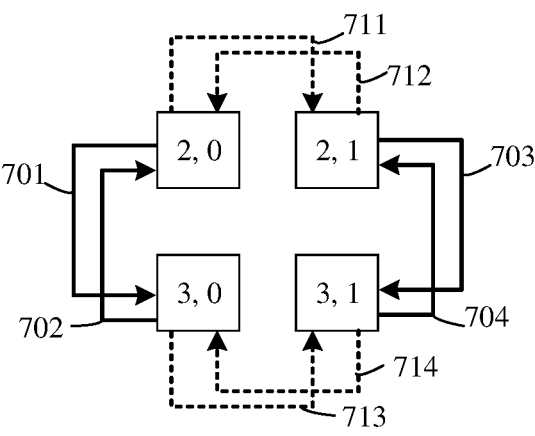
FIG. 7 shows a connection relationship among tiles in a die, a bus 603, and a bus 604.

FIG. 7 shows a connection relationship among tiles in a die, a bus 603, and a bus 604.

FIG. 7 shows two groups of buses 603. One group of buses 603 include two groups of transmission lines, which are respectively a transmission line 701 and a transmission line 702. The other group of buses 603 also include two groups of transmission lines, which are respectively a transmission line 703 and a transmission line 704.

FIG. 7 further shows two groups of buses 604. One group of buses 604 include two groups of transmission lines, which are respectively a transmission line 711 and a transmission line 712. The other group of buses 604 also include two groups of transmission lines, which are respectively a transmission line 713 and a transmission line 714.

As shown in FIG. 7, a tile (2, 0) and a tile (3, 0) are connected through the transmission line 702 and the transmission line 701. The tile (2, 0) sends data to the tile (3, 0) through the transmission line 701, and the tile (2, 0) receives data sent by the tile (3, 0) through the transmission line 702. Correspondingly, the tile (3, 0) sends data to the tile (2, 0) through the transmission line 702, and the tile (3, 0) receives data sent by the tile (2, 0) through the transmission line 701. In other words, for the tile (2, 0), the transmission line 701 is a sending bus and the transmission line 702 is a receiving bus. For the tile (3, 0), the transmission line 702 is a sending bus and the transmission line 701 is a receiving bus.

As shown in FIG. 7, the tile (2, 0) and a tile (2, 1) are connected through a transmission line 711 and a transmission line 712. The tile (2, 0) sends data to the tile (2, 1) through the transmission line 711, and the tile (2, 0) receives data sent by the tile (2, 1) through the transmission line 712. Correspondingly, the tile (2, 1) sends data to the tile (2, 0) through the transmission line 712, and the tile (2, 1) receives data sent by the tile (2, 0) through the transmission line 711. In other words, for the tile (2, 0), the transmission line 711 is a sending bus and the transmission line 712 is a receiving bus. For the tile (2, 1), the transmission line 712 is a sending bus and the transmission line 711 is a receiving bus.

Any two tiles of a same column in a same die may transmit data to each other through the bus 603, and any two tiles of a same row may transmit data to each other through the bus 604. Therefore, buses such as the bus 603 and the bus 604 may also be referred to as full-mesh buses.

Similarly, each group of transmission lines shown in FIG. 7 may include K transmission line subgroups, and each transmission line subgroup in the K transmission line subgroups may include one or more transmission lines. K is a positive integer greater than or equal to 1.

A quantity of the transmission lines included in each transmission line subgroup may be determined based on a width requirement of each transmission line subgroup and a width of a single transmission line. For example, if the width of the single transmission line is 1 bit, and the width requirement of each transmission line subgroup is 8 bits, each transmission line subgroup needs to include eight transmission lines.

In some embodiments, if the die shown in FIG. 6 is the die 301 or the die 303 shown in FIG. 3, the bus 603 may be configured to be enabled, and the bus 604 may be configured to be enabled or disabled. If the die shown in FIG. 6 is the die 302 or the die 304 shown in FIG. 3, the bus 604 may be configured to be enabled, and the bus 603 may be configured to be enabled or disabled.

Figure 8:
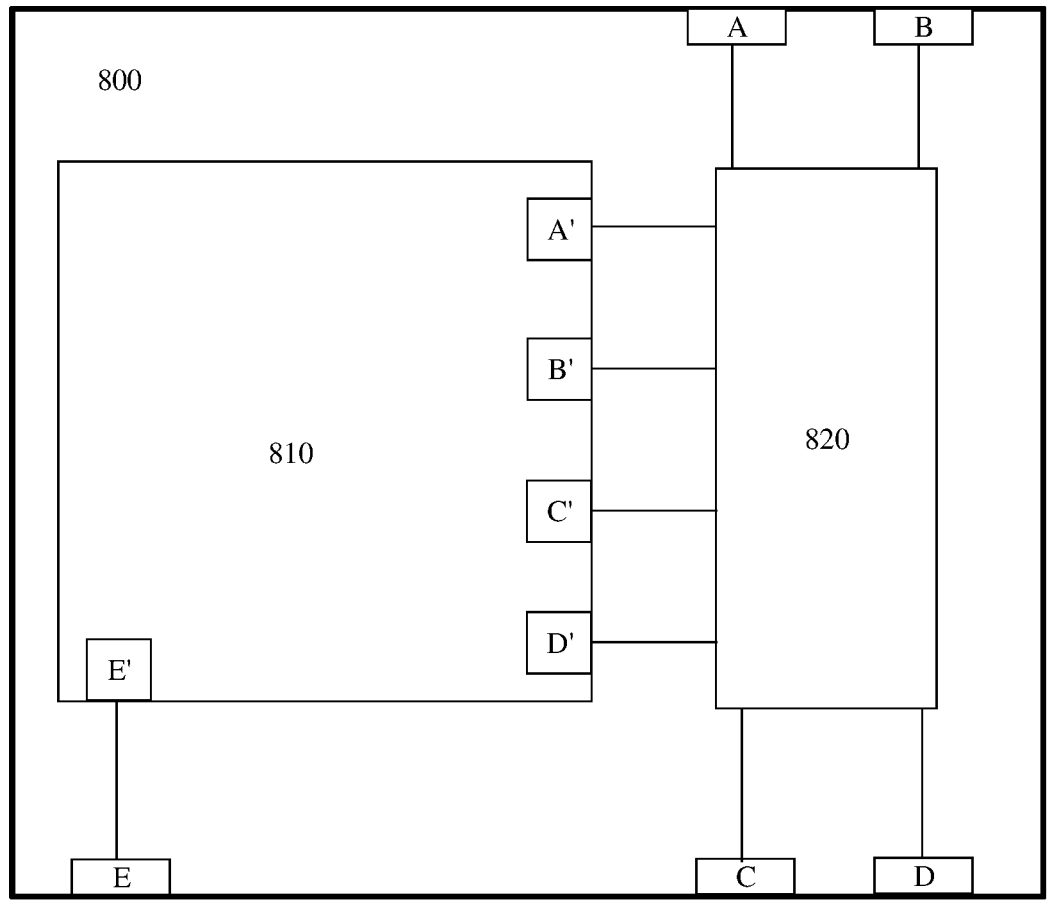
FIG. 8 is a schematic diagram of a tile.

FIG. 8 is a schematic diagram of a tile. The tile shown in FIG. 8 may be any of the tiles shown in FIG. 3 to FIG. 7. A tile 800 shown in FIG. 8 includes a kernel unit 810 and a switching unit 820.

The kernel unit 801 includes five interfaces: an interface A', an interface B', an interface C', an interface D', and an interface E', where the interface A' is an interface connected to a multidrop bus, the interface B' is an interface connected to a convergence bus, the interface C' is an interface connected to a full-mesh bus, the interface D' is an idle interface or another functional interface, and the interface E' is a network-side interface.

The tile 800 shown in FIG. 8 further includes an interface A, an interface B, an interface C, an interface D, and an interface E. The interface E is connected to the interface E'.

The switching unit 820 may be configured to control a connection relationship among the interface A, the interface B, the interface A', and the interface B'. For example, the switching unit 820 may control the interface A to be connected to the interface A', and the interface B to be connected to the interface B'. In this case, the interface A is an interface connected to the multidrop bus (namely, an interface connected to a row bus), and the interface B is an interface connected to the convergence bus (namely, an interface connected to a column bus). For another example, the switching unit 820 may control the interface A to be connected to the interface B', and the interface B to be connected to the interface A'. In this case, the interface B is an interface connected to the multidrop bus, and the interface A is an interface connected to convergence bus.

The switching unit 820 may be further configured to control a connection relationship among the interface C, the interface D, and the interface C'. For example, the switching unit 820 may control the interface C to be connected to the interface C'. In this case, the interface C is a full-mesh bus interface. For another example, the switching unit 820 may further control the interface D to be connected to the interface C'. In this case, the interface D is a full-mesh bus interface.

The switching unit 820 may be further configured to control a connection relationship among the interface C, the interface D, and the interface D'. For example, the switching unit 820 may control the interface C to be connected to the interface D'. In this case, a function of the interface C is the same as that of the interface D'. For another example, the switching unit 820 may further control the interface D to be connected to the interface D'. In this case, a function of the interface D is the same as that of the interface D'.

In some embodiments, the switching unit 820 may include two switching subunits, which may be respectively referred to as a first switching subunit and a second switching subunit. The first switching subunit is configured to control the connection relationship among the interface A, the interface B, the interface A', and the interface B'. The second switching subunit is configured to control a connection relationship among the interface C, the interface D, the interface C', and the interface D'.

In some embodiments, the interface A, the interface B, the interface C, the interface D, the interface A', the interface B', and the interface C' in the tile Boo may have the following connection relationship: the interface A is connected to the interface A', the interface B is connected to the interface B', and the interface D is connected to the interface C'. For ease of description, the connection relationship may be referred to as a first connection relationship.

In some other embodiments, the interface A, the interface B, the interface C, the interface D, the interface A', the interface B', and the interface C' in the tile 800 may have the following connection relationship: the interface A is connected to the interface B', the interface B is connected to the interface A', and the interface C is connected to the interface C'. For ease of description, this connection relationship may be referred to as a second connection relationship.

If the tile 800 is the tile 301 or the tile 303 shown in FIG. 3, a connection relationship among the interface A, the interface B, the interface C, the interface D, the interface A', the interface B', and the interface C' in the tile 800 is the first connection relationship. If the tile 800 is the tile 302 or the tile 304 shown in FIG. 3, a connection relationship between the interface A, the interface B, the interface C, the interface D, the interface A', the interface B', and the interface C' in the tile 800 is the second connection relationship.

In some embodiments, the kernel unit 810 may also not include the interface D'.

Figure 9:
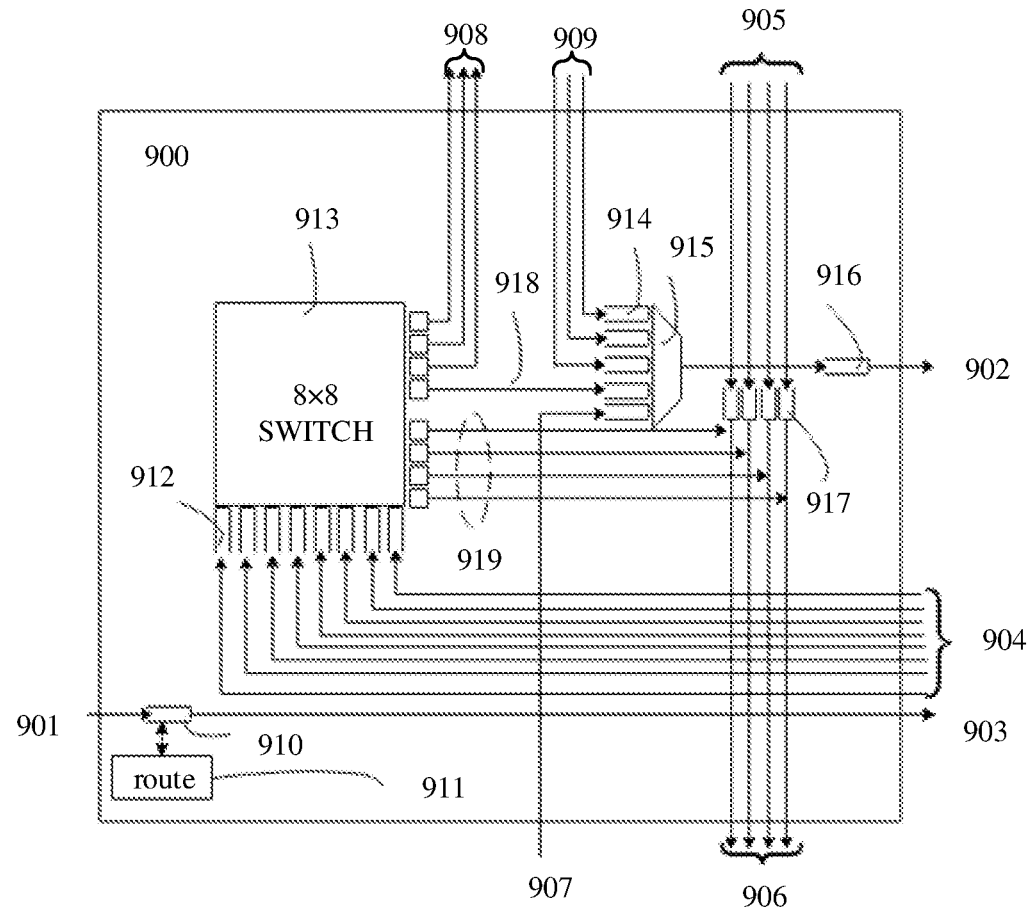
FIG. 9 is a schematic diagram of a structure of a kernel unit in a tile.

FIG. 9 is a schematic diagram of a structure of a kernel unit in a tile.

In FIG. 9, 901 is a network-side input bus interface; 902 is a network-side output bus interface; and 901 and 902 form the interface E' of the kernel unit 810 in FIG. 8.

903 is a row bus output interface connected to a lateral cross-die (for example, a die 301 to a die 302) sending and receiving bus. For example, if a kernel unit 900 is the kernel unit of the tile (2, 0) in the die 301 shown in FIG. 4, 903 is an output interface configured to be connected to a transmission line 405.

904 is a row bus input interface connected to a lateral cross-die sending and receiving bus and a lateral cross-die receiving bus. For example, if the kernel unit 900 is the kernel unit of the tile (2, 0) in the die 301 shown in FIG. 4, 904 is an input interface configured to be connected to transmission lines 401 to 408.

903 and 904 form the interface A' of the kernel unit 810 in FIG. 8.

905 is a column bus input interface 1 connected to a longitudinal cross-die (for example, the die 301 to a die 304) sending bus. For example, if the kernel unit 900 is the kernel unit of the tile (0, 2) in the die 301 shown in FIG. 5, 905 is an input interface configured to be connected to transmission lines 501 to 504.

906 is a column bus output interface connected to a longitudinal cross-die sending bus. For example, if the kernel unit 900 is the kernel unit of the tile (0, 2) in the die 301 shown in FIG. 5, 906 is an output interface configured to be connected to the transmission lines 501 to 504.

907 is a column bus input interface 2 connected to a longitudinal cross-die receiving bus. For example, if the kernel unit 900 is the kernel unit of the tile (0, 2) in the die 301 shown in FIG. 5, 907 is an input interface configured to be connected to a transmission line 505.

905, 906, and 907 form the interface B' of the kernel unit 810 in FIG. 8.

908 is a full-mesh bus output interface; 909 is a full-mesh bus input interface; and 908 and 909 form the interface C' of the kernel unit 810 in FIG. 8.

910 is an input data buffer, and is responsible for storing data from 901.

911 is a path selection module that is responsible for selecting a chip destination port for input traffic.

912 is a row data buffer, and is responsible for storing data from the lateral cross-die receiving bus.

913 is an 8×8 switching unit, and is responsible for exchanging traffic from eight tiles whose tiles are physically in a same row in the entire chip to eight tiles whose tiles are physically in a same column in the entire chip. Traffic destined for different tiles in the same row as the die is output through the port 908; traffic destined for a network-side bus of the tile is sent, through an internal interconnection line 918, to a port 902 for output; and traffic destined for dice longitudinally adjacent to the tile is sent, through an internal interconnection line 919, to a port 906 for output.

914 is a column data buffer, and receives traffic sent from eight tiles whose tiles are physically in a same column in the entire chip to a network-side egress of the current tile. 915 is a one-of-five switching unit. 916 is an output data buffer, and stores the traffic sent to the network-side egress of the current tile. 917 is a converged data buffer, and stores traffic converged from more to one.

Similarly, each connection interface in FIG. 9 may correspond to K transmission line subgroups, each transmission line subgroup includes one or more transmission lines, and K is a positive integer greater than or equal to 1.

Figure 10:
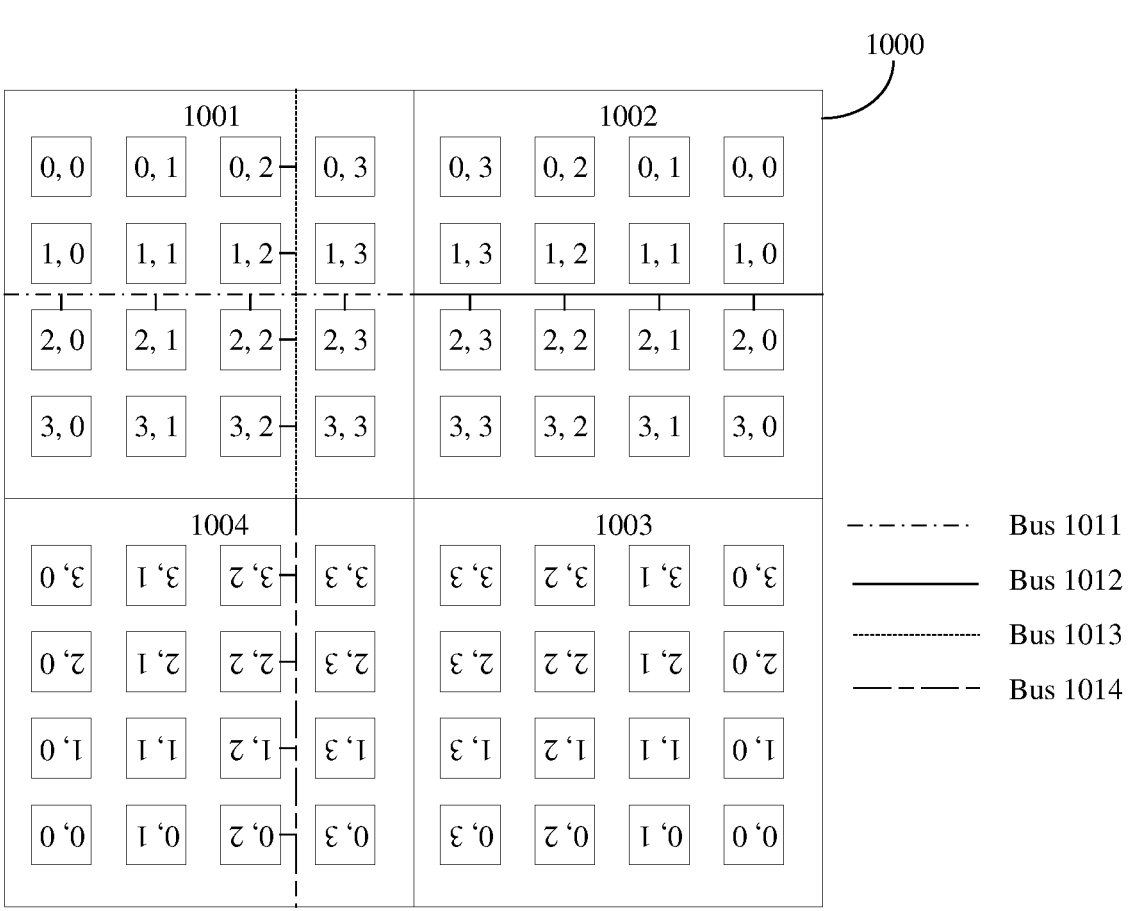
FIG. 10 is a schematic block diagram of a structure of a chip according to an embodiment of this disclosure.

FIG. 10 is a schematic block diagram of a structure of a chip according to an embodiment of this disclosure. As shown in FIG. 10, a chip moo includes dice 1001 to 1004.

As shown in FIG. 10, each of the dice 1001 to 1004 includes 4×4 tiles (tile). The die 1001 and the die 1003 are rotationally symmetrical, and a rotation angle is 180°; and the die 1002 and the die 1004 are rotationally symmetrical, and a rotation angle is 180°.

As shown in FIG. 10, a third row of tiles of the chip moo includes eight tiles in total, and the eight tiles include four tiles (respectively a tile (2, 0), a tile (2, 1), a tile (2, 2), and a tile (2, 3)) in the die low, and four tiles (respectively a tile (2, 3), a tile (2, 2), a tile (2, 1), and a tile (2, 0)) in the die 1002. The four tiles in the die 1001 are connected through a bus 1011, and the four tiles in the die 1002 are connected through a bus 1012. The bus 1011 is connected to the bus 1012. The bus 1011 is connected to a sending interface (not shown in the figure) of the die 1001, the sending interface (not shown in the figure) of the die 1001 is connected to a receiving interface (not shown in the figure) of the die 1002, and the bus 1012 is connected to the receiving interface (not shown in the figure) of the die 1002.

As shown in FIG. 10, a third column of tiles of the chip moo includes eight tiles in total, and the eight tiles include four tiles (respectively a tile (0, 2), a tile (1, 2), a tile (2, 2), and a tile (3, 2)) in the die low, and four tiles (respectively a tile (3, 2), a tile (2, 2), a tile (1, 2), and a tile (0, 2)) in the die 1004. The four tiles in the die 1001 are connected through a bus 1013, and the four tiles in the die 1004 are connected through a bus 1014. The bus 1013 is connected to the bus 1014. The bus 1013 is connected to a sending interface (not shown in the figure) of the die 1001, the sending interface (not shown in the figure) of the die 1001 is connected to a receiving interface (not shown in the figure) of the die 1004, and the bus 1014 is connected to the receiving interface (not shown in the figure) of the die 1004.

The bus 311, the bus 312, the bus 313, and the bus 314 in the chip shown in FIG. 3 are configurable. The bus 311, the bus 312, the bus 313, and the bus 314 are configured based on a location of a die. In the chip shown in FIG. 3, the bus 311 and the bus 312 are configured as row buses, and the bus 313 and the bus 314 are configured as column buses. However, in the chip shown in FIG. 10, functions of the bus 1011, the bus 1012, the bus 1013, and the bus 1014 may be fixed. In other words, the bus 1011, the bus 1012, the bus 1013, and the bus 1014 are not configurable buses. The bus 1011 and the bus 1012 are row buses, and the bus 1013 and the bus 1014 are column buses.

In the chip shown in FIG. 10, a connection manner in which row buses (for example, the bus 1011 and the bus 1012) are connected to each tile in each row is similar to the connection manner shown in FIG. 4. For brevity, details are not described herein again. A connection manner in which column buses (for example, the bus 1013 and the bus 1014) are connected to each tile in each row is similar to the connection manner shown in FIG. 5. For brevity, details are not described herein again.

Figure 11:
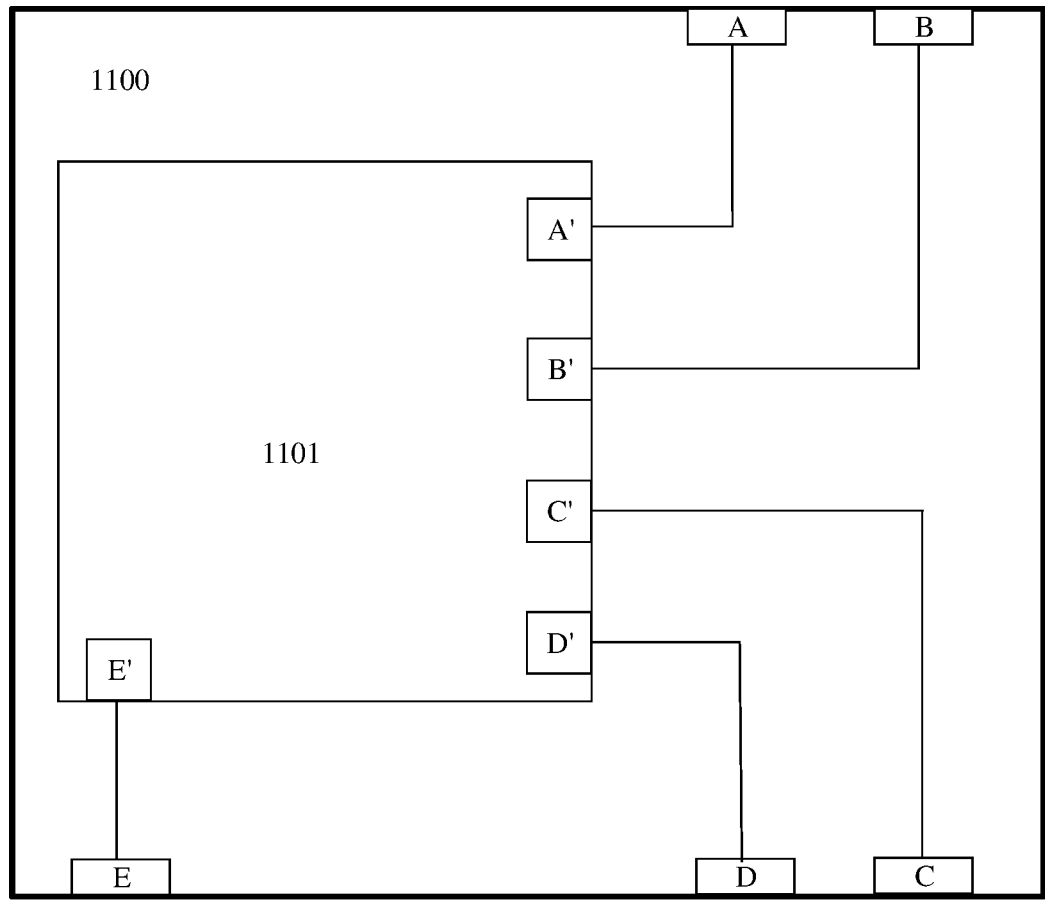
FIG. 11 is a schematic diagram of a structure of a tile in the chip shown in FIG. 10.

FIG. 11 is a schematic diagram of a structure of a tile in the chip shown in FIG. 10. A tile 1100 shown in FIG. 11 includes a kernel unit 1101.

The kernel unit 1101 includes five interfaces: an interface A', an interface B', an interface C', an interface D', and an interface E', where the interface A' is an interface connected to a multidrop bus, the interface B' is an interface connected to a convergence bus, the interface C' is an interface connected to a full-mesh bus, the interface D' is an idle interface or another functional interface, and the interface E' is a network-side interface.

The tile 1100 shown in FIG. 11 further includes an interface A, an interface B, an interface C, an interface D, and an interface E. The interface E is connected to the interface E'.

The interface A is connected to the interface A', the interface B is connected to the interface B', the interface C is connected to the interface C', and the interface D is connected to the interface D'.

In some embodiments, the kernel unit 1101 may also not include the interface D'.

As described above, functions of the row bus and the column bus in the chip shown in FIG. 10 are fixed and are no longer configurable. Therefore, a switching unit may no longer be required in each tile in the chip to control a function of each interface in the tile.

Figure 12:
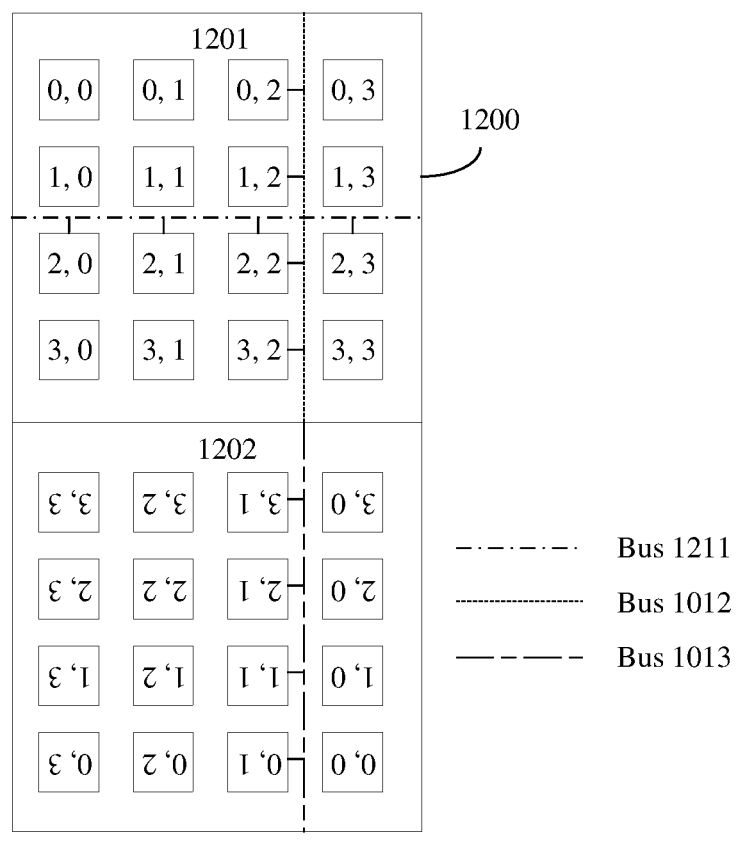
FIG. 12 is a schematic block diagram of a structure of a chip according to an embodiment of this disclosure.

FIG. 12 is a schematic block diagram of a structure of a chip according to an embodiment of this disclosure. As shown in FIG. 12, a chip 1200 includes a die 1201 and a die 1202.

As shown in FIG. 12, each of the die 1201 and the die 1202 includes 4×4 tiles (tile). The die 1201 and the die 1202 are rotationally symmetrical, and a rotation angle is 180°.

As shown in FIG. 12, a third row of tiles of the chip 1200 includes four tiles in total, and the four tiles include four tiles (respectively a tile (2, 0), a tile (2, 1), a tile (2, 2), and a tile (2, 3)) in the die 1201. The four tiles in the die 1201 are connected through a bus 1211.

As shown in FIG. 12, a third column of tiles of the chip 1200 includes eight tiles in total, and the eight tiles include four tiles (respectively a tile (0, 2), a tile (1, 2), a tile (2, 2), and a tile (3, 2)) in the die 1201 and four tiles (respectively a tile (3, 1), a tile (2, 1), a tile (1, 1), and a tile (0, 1)) in the die 1202. The four tiles in the die 1201 are connected through a bus 1212, and the four tiles in the die 1202 are connected through a bus 1213. The bus 1212 is connected to the bus 1213. The bus 1212 is connected to a sending interface (not shown in the figure) of the die 1201, the sending interface (not shown in the figure) of the die 1201 is connected to a receiving interface (not shown in the figure) of the die 1202, and the bus 1213 is connected to the receiving interface (not shown in the figure) of the die 1202.

The bus 311, the bus 312, the bus 313, and the bus 314 in the chip shown in FIG. 3 are configurable. The bus 311, the bus 312, the bus 313, and the bus 314 are configured based on a location of a die. In the chip shown in FIG. 3, the bus 311 and the bus 312 are configured as row buses, and the bus 313 and the bus 314 are configured as column buses. However, in the chip shown in FIG. 12, functions of the bus 1211, the bus 1212, and the bus 1213 may be fixed. In other words, the bus 1211, the bus 1212, and the bus 1213 are not configurable buses. The bus 1211 is a row bus, and the bus 1212 and the bus 1213 are column buses.

In the chip shown in FIG. 12, a connection manner in which a row bus (for example, the bus 1211) is connected to each tile in each row is similar to the connection manner shown in FIG. 4. For brevity, details are not described herein again. A connection manner in which column buses (for example, the bus 1212 and the bus 1213) are connected to each tile in each row is similar to the connection manner shown in FIG. 5. For brevity, details are not described herein again.

A structure of each tile in FIG. 12 is the same as that in FIG. 11.

In the foregoing embodiments, a quantity of rows and a quantity of columns of a tile array in each die are equal and equal 4. In some other embodiments, the quantity of rows and the quantity of columns in the tile array of each die may be different, or may be another positive integer greater than or equal to 2. In other words, the tile array in the die may include n×m tiles, n and m are positive integers greater than or equal to 2, and values of n and m may be the same or different.

Figure 13:
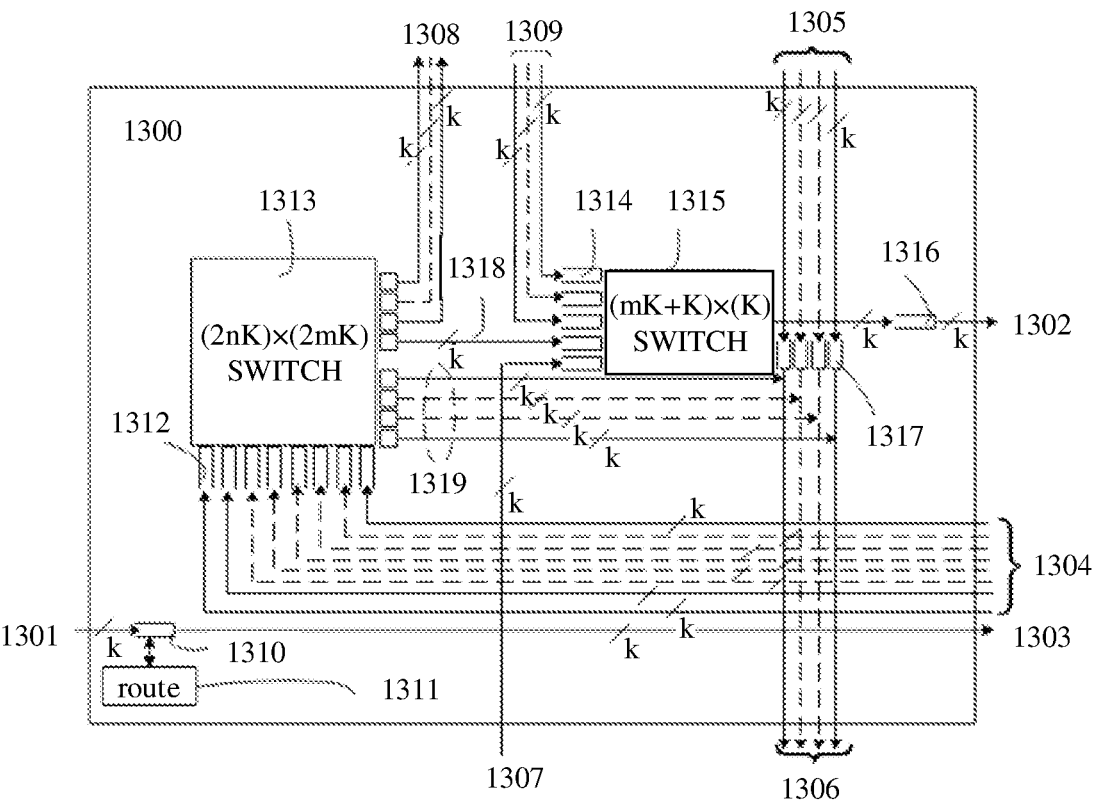
FIG. 13 is a schematic diagram of another kernel unit.

FIG. 13 is a schematic diagram of another kernel unit. The kernel unit shown in FIG. 13 is a kernel unit in a case that a tile array in a die includes n×m tiles.

FIG. 13 is a schematic diagram of a structure of a kernel unit in a tile.

In FIG. 13, 1301 is a network-side input bus interface; 1302 is a network-side output bus interface; and 1301 and 1302 form the interface E' of the kernel unit 810 in FIG. 8.

1303 is a row bus output interface connected to a lateral cross-die sending and receiving bus.

1304 is a row bus input interface connected to a lateral cross-die sending and receiving bus and a lateral cross-die receiving bus. 1304 may correspond to 2m×K transmission line subgroups.

1303 and 1304 form the interface A' of the kernel unit 810 in FIG. 8.

1305 is a column bus input interface 1 connected to a longitudinal cross-die receiving bus. 1305 may correspond to n×K transmission line subgroups.

1306 is a column bus output interface connected to a longitudinal cross-die sending bus. 1306 may correspond to n×K transmission line subgroups.

1307 is a column bus input interface 2 connected to a longitudinal cross-die receiving bus.

1305, 1306, and 1307 form the interface B' of the kernel unit 810 in FIG. 8.

1308 is a full-mesh bus output interface; 1309 is a full-mesh bus input interface; and 1308 and 1309 form the interface C' of the kernel unit 810 in FIG. 8. 1308 may correspond to $(n-1)×K$ transmission line subgroups, and 1309 may also correspond to $(n-1)×K$ transmission line subgroups.

1310 is an input data buffer, and is responsible for storing data from 1301.

1311 is a path selection module that is responsible for selecting a chip destination port for input traffic.

1312 is a row data buffer, and is responsible for storing data from the lateral cross-die receiving bus.

1313 is a $(2\ nK)×(2\ mK)$ switching unit, and is responsible for exchanging traffic from 2 m tiles whose tiles are physically in a same row in the entire chip to 2n tiles whose tiles are physically in a same column in the entire chip. Traffic destined for different tiles in the same row as the die is output through the port 1308; traffic destined for a network-side bus of the tile is sent, through an internal interconnection line 1318, to a port 1302 for output; and traffic destined for dice longitudinally adjacent to the tile is sent, through an internal interconnection line 1319, to a port 1306 for output.

1314 is a column data buffer, and receives traffic sent from 2n tiles whose tiles are physically in a same column in the entire chip to a network-side egress of the current tile. 1315 is an $(nK+K)×K$ switching unit. 1316 is an output data buffer, and stores the traffic sent to the network-side egress of the current tile. 1317 is a converged data buffer, and stores traffic converged from more to one.

Traffic switching between any two ports (a source port and a destination port) of the entire chip is mapped to traffic switching between two tiles (a source tile and a destination tile, where there is a possibility that the source tile and destination tile are a same tile); a procedure of traffic switching from the source tile to the destination tile follows a principle of first lateral sending and then longitudinal sending. The lateral here refers to lateral sending in a same die or between different dice of the entire chip. The longitudinal here refers to longitudinal sending in a same die or between different dice of the entire chip.

Traffic switching between any two ports may follow one of the following four switching procedures.

Switching procedure 1 (in which the source port and the destination port of the chip are mapped on a same die) is as follows: A chip source port→a die network-side port→a source tile→a row bus (without crossing dice)→a middle tile→an intra-die longitudinal full-mesh bus→a destination tile→a die network-side port→a chip destination port.

Switching procedure 2 (in which the source port and the destination port of the chip are mapped on two laterally adjacent dice) is as follows: A chip source port→a die network-side port→a source tile→a row bus (laterally crossing dice→a middle tile→an intra-die longitudinal full-mesh bus→a destination tile→a die network-side port→a chip destination port.

Switching procedure 3 (in which the source port and the destination port of the chip are mapped on two longitudinally adjacent dice) is as follows: A chip source port→a tile network-side port→a source tile→a row bus (without crossing dice)→a middle tile→a column bus (longitudinally crossing dice)→a destination tile→a die network-side port→a chip destination port.

Switching procedure 4 (in which the source port and the destination port of the chip are mapped on two diagonal dice) is as follows: A chip source port→a die network-side port→a source tile→a row bus (laterally crossing dice)→a middle tile→a column bus (longitudinally crossing dice)→a destination tile→a die network-side port→a chip destination port.

Figure 14:
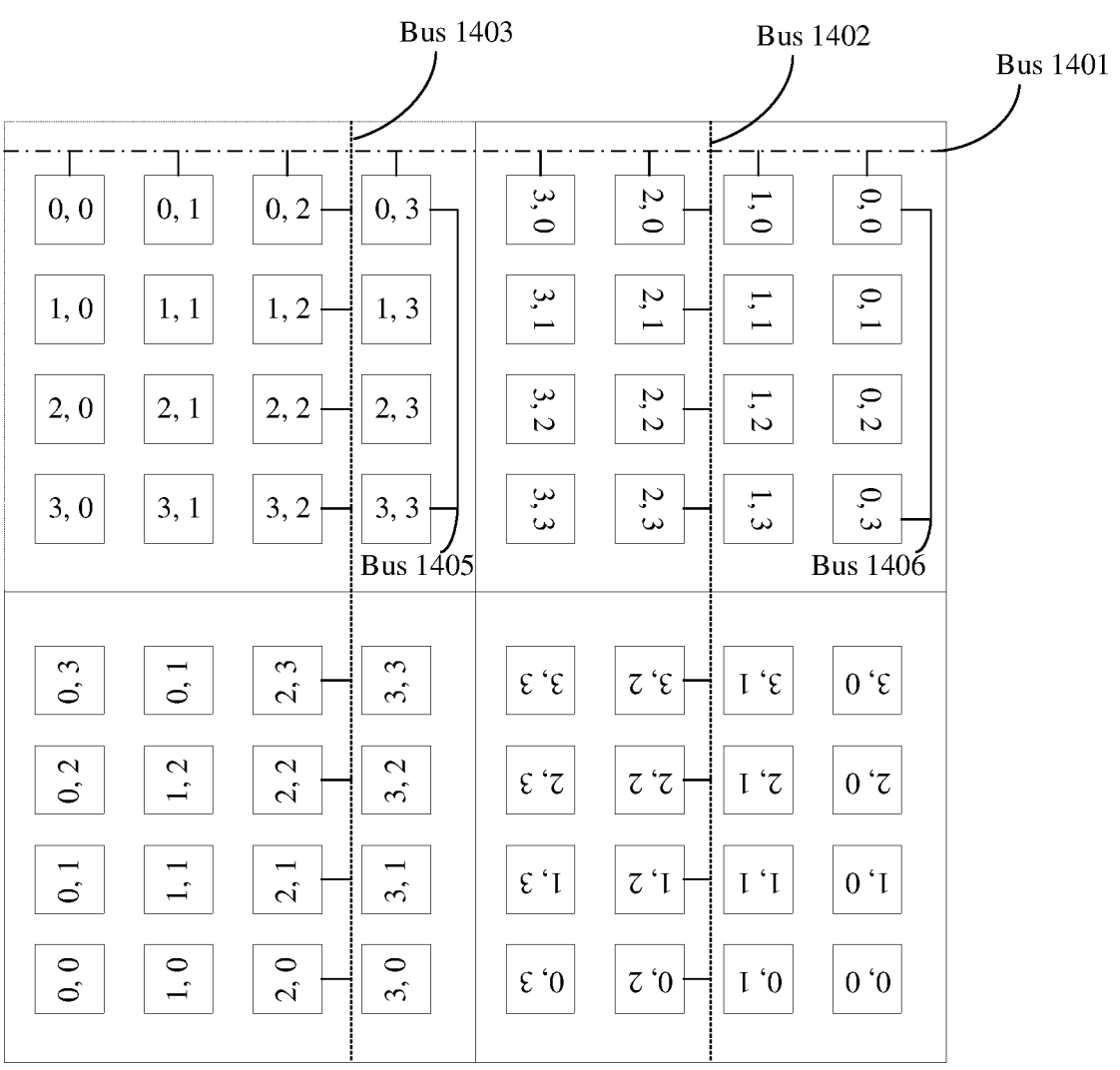
FIG. 14 is a schematic diagram of a chip.

FIG. 14 is a schematic diagram of a chip. As shown in FIG. 14, it is assumed that a die in an upper left corner is a die A, a die in an upper right corner is a die B, a die in a lower right corner is a die C, and a die in a lower left corner is a die D. A tile identified as (X, Y) in the die A is represented by Die-AXY. For example, Die-A01 represents a tile identified as (0, 1) in the die A, and Die-A33 represents a tile identified as (3, 3) in the die A.

A bus 1401 is configured as a multidrop bus, a bus 1402 and a bus 1403 are configured as convergence buses, and a bus 1405 and a bus 1406 are full-mesh buses.

It is assumed that a source tile is Die-A00 and a destination tile is Die-A33. In this case, the source tile Die-A00 sends traffic to a middle tile Die-A03 through the bus 1401, and the middle tile Die-A03 sends the traffic to the destination tile Die-A33 through the bus 1405.

It is assumed that a source tile is Die-A00 and a destination tile is Die-B03. In this case, the source tile Die-A00 sends traffic to a middle tile Die-B00 through the bus 1401, and the middle tile Die-B00 sends the traffic to the destination tile Die-B03 through the bus 1406.

It is assumed that a source tile is Die-A00 and a destination tile is Die-C02. In this case, the source tile Die-A00 sends traffic to a middle tile Die-B20 through the bus 1401, and the middle tile Die-B20 sends the traffic to the destination tile Die-C02 through the bus 1402.

It is assumed that a source tile is Die-A00 and a destination tile is Die-D20. In this case, the source tile Die-A00 sends traffic to a middle tile Die-A02 through the bus 1401, and the middle tile Die-A02 sends the traffic to the destination tile Die-D20 through the bus 1403.

The chips shown in FIG. 3, FIG. 12, and FIG. 14 can be manufactured through one-time tape-out. This is because physical structures of the dice included in each chip shown in FIG. 3 and FIG. 14 are the same, and different configurations are used based on a location of each die (for example, configurable bus is configured as a row bus or a column bus based on a location in which the die is located).

The chip shown in FIG. 10 may be manufactured only with a requirement of two or three times of tape-out. This is because a structure of the die low is not the same as that of the die 1002 after the die 1001 is rotated 90 degrees clockwise. The bus 1011 of the die 1001 obtained after being rotated 90 degrees clockwise is perpendicular to the bus 1012 in the die 1002. Similarly, a structure of the die 1003 is not the same as that of the die 1004 after the die 1003 is rotated 90 degrees clockwise. Therefore, the chip shown in FIG. 10 can be manufactured only with a requirement of two or three times of tape-out.

In the chips shown in FIG. 3, FIG. 10, FIG. 12, and FIG. 14, traffic is transmitted among longitudinal dice through a column bus. Therefore, cost of interconnection among the longitudinal dice is low. If a full-mesh bus is also used among the longitudinal dice, a quantity of longitudinal full-mesh buses required for a column of tiles between two dice is the square of a total quantity of tiles in a column of a die. Using FIG. 3 as an example, assuming that the die 301 and the die 304 are longitudinally connected by using the full-mesh bus, each column of tiles requires 16 pairs of full-mesh buses, and a total of 64 pairs of full-mesh buses are required between the die 301 and the die 304. However, if the die 301 and the die 304 are connected by using a convergence bus, only four groups of convergence buses are required between the die 301 and the die 304. It can be seen that if the longitudinal dice are connected by using the convergence bus, a quantity of buses between the dice can be reduced.

Furthermore, a pair of full-mesh buses includes a sending bus and a receiving bus. If a network-side bandwidth requirement of the die is X, both a bandwidth requirement of the sending bus in the full-mesh buses and a bandwidth requirement of the receiving bus in the full-mesh buses are X, and a bandwidth requirement of the pair of full-mesh buses is 2X. It can be seen that if the longitudinal dice are connected by using the full-mesh bus, a problem of longitudinal bandwidth expansion is caused. However, in the foregoing embodiment, the longitudinal dice are connected by using the convergence bus, which can avoid this problem. A bandwidth of each convergence bus is the same as the network-side bandwidth requirement of the die.

An embodiment of this disclosure further provides an electronic device. The electronic device includes any one of the foregoing chips or any one of the foregoing integrated circuits. The integrated circuit includes a tile, a kernel unit, or a die. The electronic device may be a network device, for example, a switch or a router, or may be a server or a storage device. It may be understood that, in addition to any one of the foregoing chips or any one of the foregoing integrated circuits, the electronic device may further include some necessary components, such as an input/output circuit and a power supply.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular disclosures and design constraint conditions of the technical solutions. A person skilled in the art may use different methods to implement the described functions of each particular disclosure, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist independently physically, or two or more units may be integrated into one unit.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A chip, comprising:

D dice, wherein D is a positive integer greater than or equal to 2, the D dice comprise a first die and a second die, the first die comprises a first tile array, the second die comprises a second tile array, an arrangement of the first tile array on the first die and an arrangement of the second tile array on the second die are rotationally symmetrical, and wherein the first die further comprises N groups of first buses, the second die further comprises N groups of third buses, at least one group of the N groups of first buses connects each tile in a first row of the first tile array, at least one group of the N groups of third buses connects each tile in a first row of the second tile array, the first row of the first tile array and the first row of the second tile array are a same row, and the at least one group of the N groups of first buses is connected to the at least one group of the N groups of third buses.

2. The chip according to claim 1, wherein a value of D is 4, and the D dice further comprise a third die comprising a third tile array and a fourth die comprising a fourth tile array, and wherein:

the arrangement of the second tile array on the second die and an arrangement of the third tile array on the third die are rotationally symmetrical;

the arrangement of the third tile array on the third die and an arrangement of the fourth tile array on the fourth die are rotationally symmetrical; and the arrangement of the fourth tile array on the fourth die and the arrangement of the first tile array on the first die are rotationally symmetrical.

3. The chip according to claim 2, wherein:

a rotation angle between the arrangement of the second tile array on the second die and the arrangement of the first tile array on the first die is 90°;

a rotation angle between the arrangement of the third tile array on the third die and the arrangement of the second tile array on the second die is 90°;

a rotation angle between the arrangement of the fourth tile array on the fourth die and the arrangement of the third tile array on the third die is 90°; and a rotation angle between the arrangement of the first tile array on the first die and the arrangement of the fourth tile array on the fourth die is 90°.

4. The chip according to claim 2, wherein the first tile array comprises N×N tiles, and N is a positive integer greater than or equal to 2;

the second tile array comprises N×N tiles;

the third tile array comprises N×N tiles; and the fourth tile array comprises N×N tiles.

5. The chip according to claim 4, wherein:

the first die further comprises N groups of second buses;

the second die further comprises N groups of fourth buses;

the third die further comprises N groups of fifth buses and N groups of sixth buses; and the fourth die further comprises N groups of seventh buses and N groups of eighth buses, wherein first buses of the N groups of first buses, second buses of the N groups of second buses, third buses of the N groups of third buses, fourth buses of the N groups of fourth buses, fifth buses of the N groups of fifth buses, sixth buses of the N groups of sixth buses, seventh buses of the N groups of seventh buses, and eighth buses of the N groups of eighth buses are configurable as row buses or column buses; and wherein configurations of the first buses, the third buses, the fifth buses, and the seventh buses are the same, configurations of the second buses, the fourth buses, the sixth buses, and the eighth buses are the same, and configurations of the first buses and the second buses are different.

6. The chip according to claim 5, wherein an $n^{th}$ group of first buses in the N groups of first buses is connected to an $n^{th}$ group of third buses in the N groups of third buses, N tiles of the first tile array in an $n^{th}$ row of tiles in the chip are connected to the $n^{th}$ group of first buses, N tiles of the second tile array in the $n^{th}$ row of tiles are connected to the $n^{th}$ group of third buses, and n is a positive integer greater than or equal to 1 and less than or equal to N;

an $n^{th}$ group of fifth buses in the N groups of fifth buses is connected to an $n^{th}$ group of seventh buses in the N groups of seventh buses, N tiles of the third tile array in an $(N+n)^{th}$ row of tiles in the chip are connected to the $n^{th}$ group of fifth buses, and N tiles of the fourth tile array in the $(N+n)^{th}$ row of tiles are connected to the $n^{th}$ group of seventh buses;

an $n^{th}$ group of second buses in the N groups of second buses is connected to an $n^{th}$ group of eighth buses in the N groups of eighth buses, N tiles of the first tile array in an $n^{th}$ column of tiles in the chip are connected to the $n^{th}$ group of second buses, and N tiles of the fourth tile array in the $n^{th}$ column of tiles are connected to the $n^{th}$ group of eighth buses; and an $n^{th}$ group of fourth buses in the N groups of fourth buses is connected to an $n^{th}$ group of sixth buses in the N groups of sixth buses, N tiles of the second tile array in an $(N+n)^{th}$ column of tiles in the chip are connected to the $n^{th}$ group of fourth buses, and N tiles of the third tile array in the $(N+n)^{th}$ column of tiles are connected to the $n^{th}$ group of sixth buses.

7. The chip according to claim 6, wherein the first buses of the N groups of first buses are configured as row buses, and the second buses of the N groups of second buses are configured as column buses;

wherein the $n^{th}$ group of first buses comprises 2×N groups of transmission lines, each group of transmission lines in the 2×N groups of transmission lines comprises K transmission line subgroups, a first interface of an $n^{th}$ tile in the $n^{th}$ row of tiles comprises a first sending interface and a first receiving interface, the first sending interface is connected to one group of transmission lines in the 2×N groups of transmission lines, the first receiving interface is connected to the 2×N groups of transmission lines, and K is a positive integer greater than or equal to 1; and wherein the $n^{th}$ group of second buses comprises N groups of first transmission lines and N groups of second transmission lines, each group of transmission lines in the N groups of first transmission lines and the N groups of second transmission lines comprises K transmission line subgroups, a second interface of an $n^{th}$ tile in the $n^{th}$ column of tiles comprises a second sending interface and a second receiving interface, the second sending interface is connected to the N groups of first transmission lines, and the second receiving interface is connected to an $n^{th}$ group of second transmission lines in the N groups of second transmission lines.

8. The chip according to claim 7, wherein the N groups of first transmission lines in the $n^{th}$ group of second buses are connected to N groups of third transmission lines in the $n^{th}$ group of eighth buses, and the N groups of second transmission lines in the $n^{th}$ group of second buses are connected to N groups of fourth transmission lines in the $n^{th}$ group of eighth buses.

9. The chip according to claim 4, wherein any two tiles in N tiles belonging to a same die in each column of tiles in the chip are connected through one group of ninth buses, and each ninth bus comprises 2×K transmission line subgroups.

10. A chip, comprising:

D dice, wherein the D dice comprise:

a first die comprising a first tile array;

a second die comprising a second tile array, wherein an arrangement of the first tile array on the first die and an arrangement of the second tile array on the second die are rotationally symmetrical;

a third die comprising a third tile array; and a fourth die comprising a fourth tile array, wherein an arrangement of the third tile array on the third die and an arrangement of the fourth tile array on the fourth die are rotationally symmetrical, and wherein:

the first tile array comprises N×M tiles, N is a positive integer greater than or equal to 2, and M is a positive integer greater than or equal to 2;

the second tile array comprises N×M tiles;

the third tile array comprises N×M tiles;

the fourth tile array comprises N×M tiles;

the first die further comprises N groups of first row buses and M groups of first column buses;

the second die further comprises N groups of second row buses and M groups of second column buses;

the third die further comprises N groups of third row buses and M groups of third column buses;

the fourth die further comprises N groups of fourth row buses and M groups of fourth column buses;

an $n^{th}$ group of first row buses in the N groups of first row buses is connected to an $n^{th}$ group of third row buses in the N groups of third row buses, and n is a positive integer greater than or equal to 1 and less than or equal to N;

an $m^{th}$ group of first column buses in the M groups of first column buses is connected to an $m^{th}$ group of fourth column buses in the M groups of fourth column buses, and m is a positive integer greater than or equal to 1 and less than or equal to M;

an $n^{th}$ group of fourth row buses in the N groups of fourth row buses is connected to an $n^{th}$ group of second row buses in the N groups of second row buses;

an $m^{th}$ group of third column buses in the M groups of third column buses is connected to an $m^{th}$ group of second column buses in the M groups of second column buses;

the $m^{th}$ group of first column buses in the M groups of first column buses comprises N groups of first transmission lines and N groups of second transmission lines, each group of transmission lines in the N groups of first transmission lines and the N groups of second transmission lines comprises K transmission line subgroups, a first interface of an $n^{th}$ tile in an $m^{th}$ column of tiles in the first tile array comprises a first sending interface and a first receiving interface, the first sending interface is connected to the N groups of first transmission lines, and the first receiving interface is connected to an $n^{th}$ group of second transmission lines in the N groups of second transmission lines;

the $m^{th}$ group of fourth column buses in the M groups of fourth column buses comprises N groups of third transmission lines and N groups of fourth transmission lines, each group of transmission lines in the N groups of third transmission lines and the N groups of fourth transmission lines comprises K transmission line subgroups, a second interface of an $n^{th}$ tile in an $m^{th}$ column of tiles in the fourth tile array comprises a second sending interface and a second receiving interface, the second sending interface is connected to the N groups of third transmission lines, and the second receiving interface is connected to an $n^{th}$ group of fourth transmission lines in the N groups of fourth transmission lines; and the N groups of first transmission lines are connected to the N groups of third transmission lines, and the N groups of second transmission lines are connected to the N groups of fourth transmission lines.

11. A chip, comprising:

D dice, wherein the D dice comprise:

a first die comprising a first tile array;

a second die comprising a second tile array, wherein an arrangement of the first tile array on the first die and an arrangement of the second tile array on the second die are rotationally symmetrical, and wherein:

the first tile array comprises N×M tiles, N is a positive integer greater than or equal to 2, and M is a positive integer greater than or equal to 2;

the second tile array comprises N×M tiles;

the first die further comprises N groups of first row buses and M groups of first column buses;

the second die comprises N groups of second row buses and M groups of second column buses;

an $m^{th}$ group of first column buses in the M groups of first column buses is connected to an $m^{th}$ group of second column buses in the M groups of second column buses, and m is a positive integer greater than or equal to 1 and less than or equal to M;

the $m^{th}$ group of first column buses in the M groups of first column buses comprises N groups of first transmission lines and N groups of second transmission lines, each group of transmission lines in the N groups of first transmission lines and the N groups of second transmission lines comprises K transmission line subgroups, a first interface of an $n^{th}$ tile in an $m^{th}$ column of tiles in the first tile array comprises a first sending interface and a first receiving interface, the first sending interface is connected to the N groups of first transmission lines, and the first receiving interface is connected to an $n^{th}$ group of second transmission lines in the N groups of second transmission lines;

the $m^{th}$ group of second column buses in the M groups of second column buses comprises N groups of third transmission lines and N groups of fourth transmission lines, each group of transmission lines in the N groups of third transmission lines and the N groups of fourth transmission lines comprises K transmission line subgroups, a second interface of an $n^{th}$ tile in an $m^{th}$ column of tiles in the second tile array comprises a second sending interface and a second receiving interface, the second sending interface is connected to the N groups of third transmission lines, and the second receiving interface is connected to an $n^{th}$ group of fourth transmission lines in the N groups of fourth transmission lines; and the N groups of first transmission lines are connected to the N groups of third transmission lines, and the N groups of second transmission lines are connected to the N groups of fourth transmission lines.

12. The chip according to claim 10, wherein any two tiles in N tiles belonging to a same die in each column of tiles in the chip are connected through one group of tenth buses, and each tenth bus comprises 2×K transmission line subgroups.

13. The chip according to claim 1, wherein each tile in the first tile array and the second tile array comprises two configurable interfaces.

14. The chip according to claim 13, wherein a first configurable interface in the two configurable interfaces of each tile in the first tile array and the second tile array is configured to connect to a row bus, and a second configurable interface in the two configurable interfaces of each tile in the first tile array and the second tile array is configured to connect to a column bus.

15. The chip according to claim 14, wherein the first configurable interface in the two configurable interfaces of each tile in the first tile array and the second tile array comprises an input interface and an output interface, and the second configurable interface in the two configurable interfaces of each tile in the first tile array and the second tile array comprises an input interface and an output interface.

16. The chip according to claim 10, wherein each tile in the first tile array and the second tile array comprises two configurable interfaces.

17. The chip according to claim 16, wherein a first configurable interface in the two configurable interfaces of each tile in the first tile array and the second tile array is configured to connect to a row bus, and a second configurable interface in the two configurable interfaces of each tile in the first tile array and the second tile array is configured to connect to a column bus.

18. The chip according to claim 17, wherein the first configurable interface in the two configurable interfaces of each tile in the first tile array and the second tile array comprises an input interface and an output interface, and the second configurable interface in the two configurable interfaces of each tile in the first tile array and the second tile array comprises an input interface and an output interface.

19. The chip according to claim 11, wherein each tile in the first tile array and the second tile array comprises two configurable interfaces.

20. The chip according to claim 19, wherein a first configurable interface in the two configurable interfaces of each tile in the first tile array and the second tile array is configured to connect to a row bus, and a second configurable interface in the two configurable interfaces of each tile in the first tile array and the second tile array is configured to connect to a column bus.

* * * * *